United States Patent
Yoshida et al.

(10) Patent No.: US 9,436,166 B2
(45) Date of Patent: Sep. 6, 2016

(54) ENCODER, MOTOR WITH ENCODER, AND SERVO SYSTEM

(71) Applicant: KABUSHIKI KAISHA YASKAWA DENKI, Kitakyushu-shi (JP)

(72) Inventors: Yasushi Yoshida, Kitakyushu (JP); Yasuhiro Matsutani, Kitakyushu (JP); Shiro Yoshidomi, Kitakyushu (JP); Hiroshi Takada, Kitakyushu (JP); Yuji Arinaga, Kitakyushu (JP); Ikuma Murokita, Kitakyushu (JP); Masanobu Harada, Kitakyushu (JP); Hiroki Kondo, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 15 days.

(21) Appl. No.: 14/532,007

(22) Filed: Nov. 4, 2014

(65) Prior Publication Data
US 2015/0123588 A1   May 7, 2015

(30) Foreign Application Priority Data
Nov. 5, 2013  (JP) ................. 2013-229831

(51) Int. Cl.
*G01D 5/347*  (2006.01)
*G01D 5/245*  (2006.01)
(Continued)

(52) U.S. Cl.
CPC ............. *G05B 1/04* (2013.01); *G01D 5/34792* (2013.01); *G01D 5/36* (2013.01); *H02K 11/22* (2016.01)

(58) Field of Classification Search
CPC ........... G01D 5/34792; G01D 5/3473; G01D 5/34715; G01D 5/34776; G01D 5/347; G01D 5/24461; G01D 5/34707; G01D 5/34746; G01D 5/145; G01D 5/34784; G01D 5/24466; G01D 5/24476; G01D 5/2448; G01D 5/2452
USPC .................................. 318/602–605
See application file for complete search history.

(56) References Cited

U.S. PATENT DOCUMENTS 8,698,071 B2 * 4/2014 Nagura .............. G01D 5/24438
                                                     250/231.14
9,080,898 B2 * 7/2015 Yoshida ................. G01D 5/145
(Continued)

FOREIGN PATENT DOCUMENTS

CN        101405576        4/2009
CN        101832790        9/2010
(Continued)

OTHER PUBLICATIONS

Japanese Office Action for corresponding JP Application No. 2013-229831, Jun. 21, 2016 (w/ English machine translation).
(Continued)

*Primary Examiner* — Bentsu Ro
(74) *Attorney, Agent, or Firm* — Mori & Ward, LLP

(57) ABSTRACT

An encoder includes a plurality of slit tracks, a point light source, a first to third light-receiving arrays. The plurality of slit tracks respectively comprises a plurality of reflection slits. The point light source emits diffusion light to the plurality of slit tracks. The first light-receiving array receives light reflected by the slit track comprising an incremental pattern. The second light-receiving array receives light reflected by the slit track comprising an incremental pattern longer in pitch than other incremental patterns, and is disposed at a position on a side of a direction where the point light source is disposed, than the first light-receiving array, The third light-receiving array receives light reflected by the slit track comprising an absolute pattern, and is disposed at a position on a side of a direction where the point light source is disposed, than the first light-receiving array.

17 Claims, 22 Drawing Sheets

(51) Int. Cl.
*G05B 1/04* (2006.01)
*G01D 5/36* (2006.01)

(56) References Cited

U.S. PATENT DOCUMENTS

| | | |
|---|---|---|
| 2005/0017158 A1 | 1/2005 | Kojima |
| 2009/0321621 A1 | 12/2009 | Yoshida et al. |
| 2010/0224768 A1 | 9/2010 | Yoshida et al. |
| 2011/0155895 A1 | 6/2011 | Nagura |
| 2012/0205527 A1* | 8/2012 | Yoshida ............ G01D 5/145 250/231.1 |
| 2013/0154447 A1 | 6/2013 | Harada |
| 2013/0229138 A1 | 9/2013 | Yoshida et al. |
| 2013/0306849 A1 | 11/2013 | Yoshida et al. |

FOREIGN PATENT DOCUMENTS

| | | |
|---|---|---|
| CN | 102636199 | 8/2012 |
| EP | 2093543 | 8/2009 |
| JP | 2005-003669 | 1/2005 |
| JP | 2007-183116 | 7/2007 |
| JP | 2009-198318 | 9/2009 |
| JP | 2011-133286 | 7/2011 |
| JP | 2012-103032 | 5/2012 |
| JP | 2013-130394 | 7/2013 |

OTHER PUBLICATIONS

Chinese Office Action for corresponding CN Application No. 201410602653.7, Jul. 6, 2016.

* cited by examiner

ENCODER, MOTOR WITH ENCODER, AND SERVO SYSTEM

CROSS-REFERENCE TO RELATED APPLICATION

The present application claims priority from Japanese Patent Application No. 2013-229831, which was filed on Nov. 5, 2013, the disclosure of which is incorporated herein by reference in its entirety.

BACKGROUND OF THE INVENTION

1. Field of the Invention

The present disclosure relates to an encoder, a motor with an encoder, and a servo system.

2. Description of the Related Art

A reflection type encoder is known.

SUMMARY OF THE INVENTION

According to one aspect of the disclosure, there is provided an encoder. The encoder comprises a plurality of slit tracks, a point light source, a first light-receiving array, a second light-receiving array, and. a third light-receiving array. The plurality of slit tracks respectively comprises a plurality of reflection slits arranged along a measurement direction. The point light source is configured to emit diffusion light to the plurality of slit tracks. The first light-receiving array is configured to receive light reflected by the slit track comprising an incremental pattern. The second light-receiving array is configured to receive light reflected by the slit track comprising an incremental pattern longer in pitch than other incremental patterns, and is disposed at a position on a side of a direction where the point light source is disposed, than the first light-receiving array, The third light-receiving array is configured to receive light reflected by the slit track comprising an absolute pattern, and is disposed at a position on a side of a direction where the point light source is disposed, than the first light-receiving array.

According to another aspect of the disclosure, there is provided an encoder. The encoder comprises a plurality of slit tracks, means for emitting diffusion light to the plurality of slit tracks, means for receiving light reflected by the slit track comprising an incremental pattern, means for receiving light reflected by the slit track comprising an incremental pattern longer in pitch than other incremental patterns, and means for receiving light reflected by the slit track comprising an absolute pattern. The plurality of slit tracks respectively comprises a plurality of reflection slits arranged along a measurement direction. The means for receiving light reflected by the slit track comprising an incremental pattern longer in pitch than other incremental patterns, is disposed at a position on a side of a direction where the point light source is disposed, than the means for receiving light reflected by the slit track comprising the incremental pattern. The means for receiving light reflected by the slit track comprising an absolute pattern, is disposed at a position on a side of a direction where the point light source is disposed, than the means for receiving light reflected by the slit track comprising the incremental pattern According to another aspect of the disclosure, there is provided a motor with an encoder. The motor with an encoder, comprises a linear motor or a rotary motor, and the above-described encoder. A mover moves with respect to a stator in the linear motor. A rotor rotates with respect to a stator in the rotary motor. The encoder is configured to detect at least one of a position and a velocity of the mover or the rotor.

According to another aspect of the disclosure, there is provided a servo system. The serve system comprises a liner motor or a rotary motor, the above-described encoder, and a controller. A mover moves with respect to a stator in the linear motor. A rotor rotates with respect to a stator in the rotary motor. The encoder is configured to detect at least one of a position and a velocity of the mover or the rotor. The controller is configured to control the linear motor or the rotary motor based on a detection result of the encoder.

DETAILED DESCRIPTION OF THE EMBODIMENTS

The following describes an embodiment with reference to accompanying drawings.

Note that the encoder related to the embodiment described hereinafter is applicable to various types of encoders, such as a rotary type and a linear type. In the following, the embodiments are described using the rotary-type encoder as an example to ensure ease of encoder understanding. In a case where the embodiments are to be applied to another encoder type, it is possible to apply the type by adding appropriate changes, such as changing the object to be measured from a rotary-type disk to a linear scale, and thus detailed descriptions thereof are omitted.

1. Servo System

Figure 1:
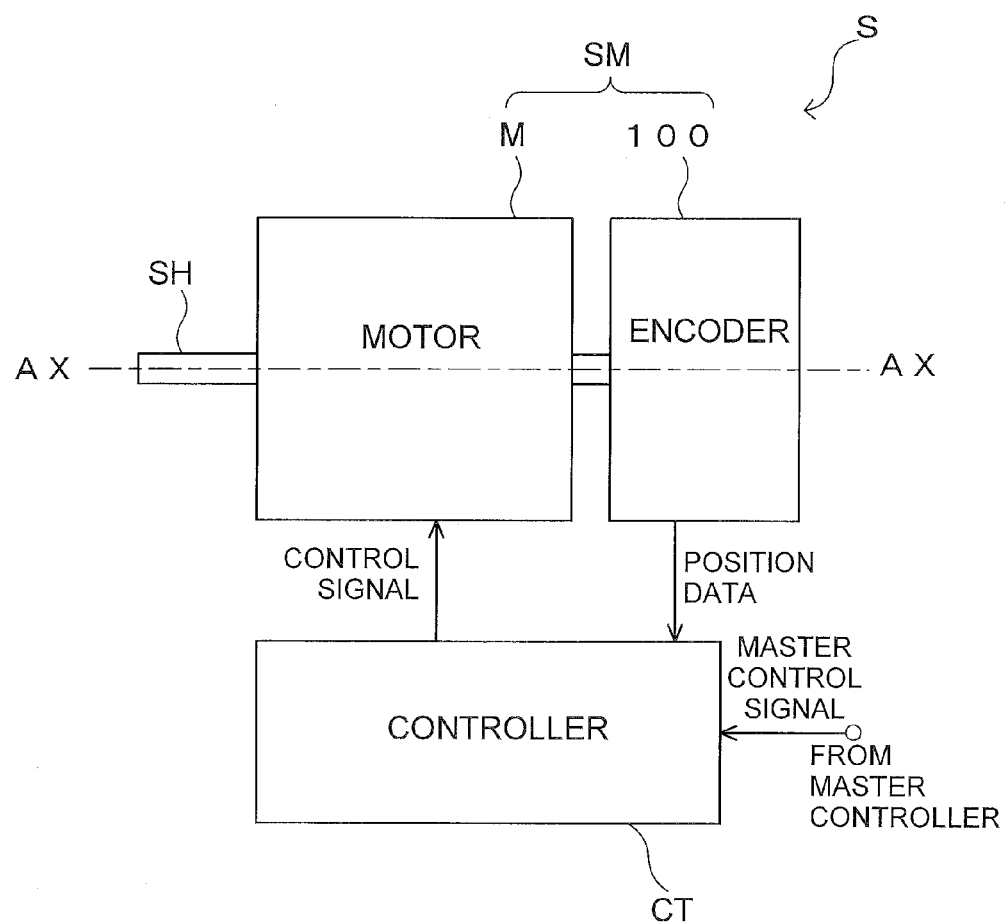
FIG. 1 is an explanatory view for explaining a servo system related to an embodiment.

First, the configuration of a servo system related to this embodiment will be described with reference to FIG. 1. As shown in FIG. 1, the servo system S comprises a servo motor SM and a controller CT. The servo motor SM comprises an encoder 100 and a motor M.

The motor M is an example of a power generation source not including the encoder 100. The motor M is a rotary-type motor in which a rotor (not shown) rotates with respect to a stator (not shown), and outputs a rotational force by rotating a shaft SH fixed to the rotor around an axis AX.

Further, the motor M alone is sometimes referred to as a servo motor, but, in this embodiment, the configuration including the encoder 100 is referred to as the servo motor SM. That is, the servo motor SM corresponds to one example of a motor with an encoder. The following, for convenience of explanation, describes a case where the motor with an encoder is a servo motor controlled so as to follow target values, such as position and velocity values, but the motor is not necessarily limited to a servo motor. In a case where the output of the encoder is used for display only, for example, the motor with an encoder also includes motors used in a system other than a servo system, as long as an encoder is attached.

The motor M is not particularly limited as long as it is a motor in which the encoder 100 is capable of detecting position data and the like, for example. Further, the motor M is not limited to an electric motor that uses electricity as a power source, and it may be a motor that uses, for example, another power source, such as a hydraulic motor, a pneumatic motor, and a steam motor. However, for convenience of explanation, the following describes a case where the motor M is an electric motor.

The encoder 100 is connected to the side opposite the rotational force output side of the shaft SH of the motor M. Note that the connected side is not necessarily limited to the opposite side, allowing the encoder 100 to be connected to the rotational force output side of the shaft SH. The encoder 100 detects a position of the motor M (also referred to as a rotational angle) by detecting the position of the shaft SH (rotor), and outputs position data representing the position.

The encoder 100 may detect at least one of a velocity of the motor M (also referred to as rotation speed, angular velocity, and the like) and an acceleration of the motor M (also referred to as rotation acceleration, angular accelera-tion, and the like) in addition to or in place of the position of the motor M. In this case, the velocity and the acceleration of the motor M can be detected by, for example, obtaining the first derivative or the second derivative of the position with respect to time, or counting a detection signal (an incremental signal described later, for example) for a predetermined period of time. For convenience of explanation, the following describes the embodiment with the physical quantity detected by the encoder 100 as the position.

The controller CT acquires position data output from the encoder 100, and controls the rotation of the motor M based on the position data. Consequently, in this embodiment where an electric motor is used as the motor M, the controller CT controls the rotation of the motor M by controlling the current, voltage, or the like to be applied to the motor M based on position data. Furthermore, it is also possible for the controller CT to control the motor M by acquiring a master control signal from a master controller (not shown) so that a rotational force capable of achieving a position and the like represented by the master control signal is output from the shaft SH of the motor M. Note that, in a case where the motor M uses another power source, such as a hydraulic, pneumatic, or steam motor, it is possible for the controller CT to control the rotation of the motor M by controlling the supply of the power source.

2. Encoder

Figure 2:
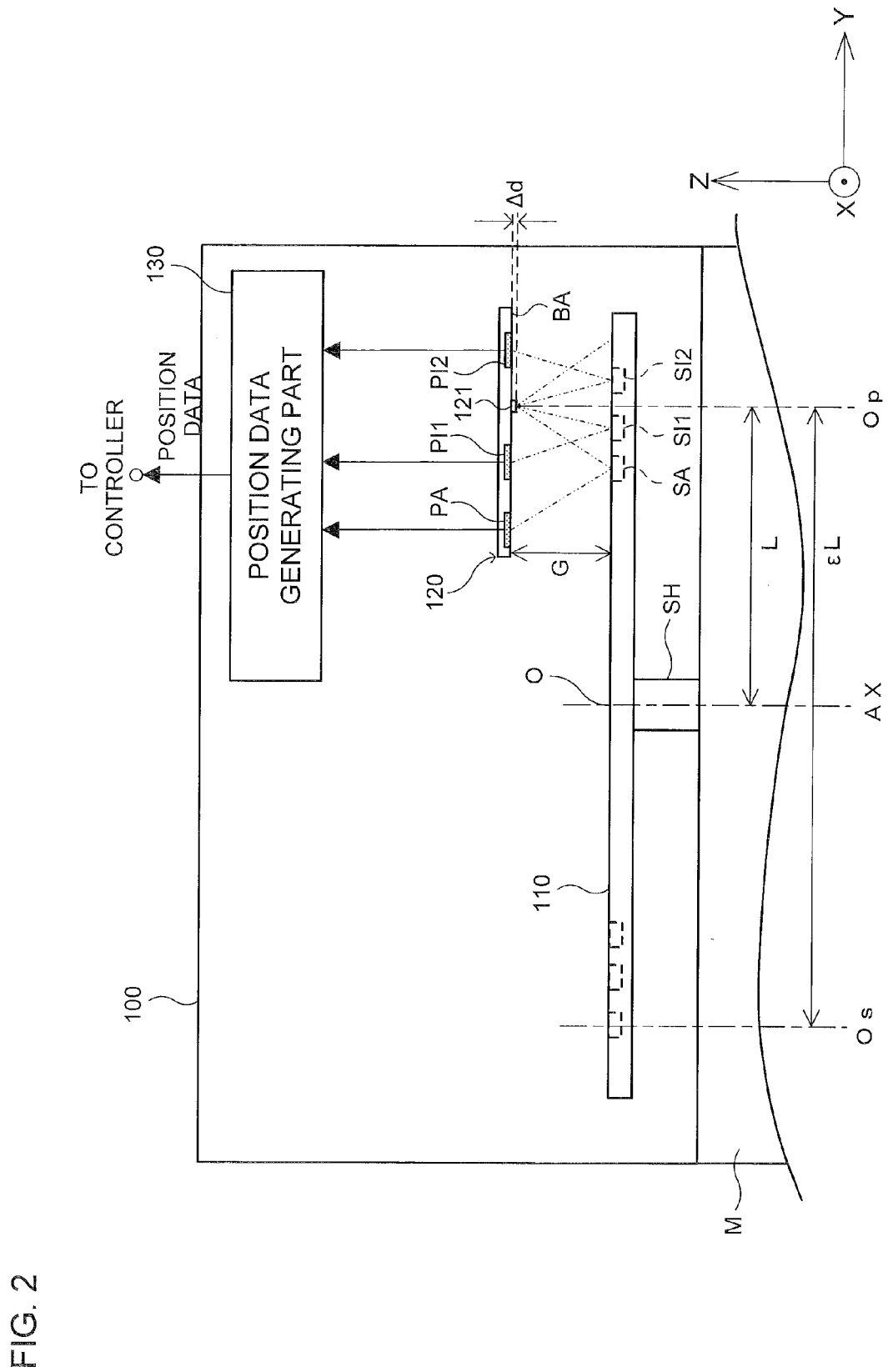
FIG. 2 is an explanatory view for explaining an encoder related to the embodiment.

Next, the encoder 100 related to this embodiment will be described. As shown in FIG. 2, the encoder 100 comprises a disk 110, an optical module 120, and a position data generating part 130.

Here, for convenience of explanation of a structure of the encoder 100, directions, such as upward and downward directions, are defined and suitably used as follows. In FIG. 2, the direction in which the disk 110 faces the optical module 120, that is, the positive direction along the Z axis, is referred to as "upward" and the negative direction along the Z axis is referred to as "downward." Note that the directions vary according to the attachment mode of the encoder 100, and the positional relationship of each configuration of the encoder 100 is not limited.

2-1. Disk

Figure 3:
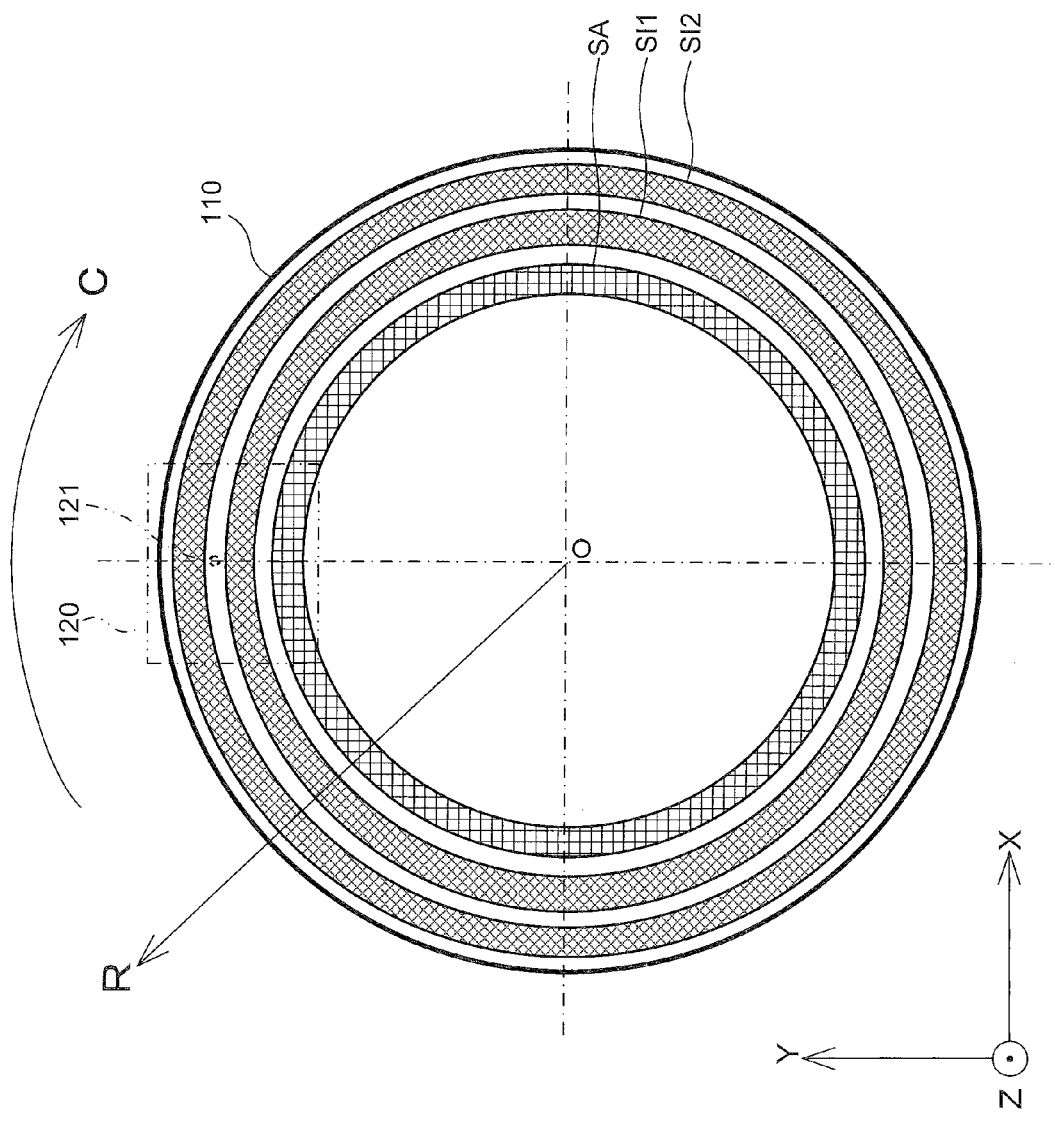
FIG. 3 is an explanatory view for explaining a disk related to the embodiment.

The disk 110 is formed into the shape of a circular plate as shown in FIG. 3, and disposed so that a disk center O substantially agrees with the axis AX. The disk 110 is connected to the shaft SH of the motor M, and rotates by the rotation of the shaft SH. Note that, in this embodiment, explanation is given with the disk 110 in the shape of a circular plate as an example of an object to be measured that measures the rotation of the motor M. However, it is also possible to use another member, such as an end surface of the shaft SH, for example, as an object to be measured. Further, while the disk 110 is directly connected to the shaft SH in the example shown in FIG. 2, the disk 110 may be connected via a connecting member such as a hub.

As shown in FIG. 3, the disk 110 comprises a plurality of slit tracks SA, SI1, SI2. While the disk 110 rotates with the drive of the motor M, the optical module 120 is disposed fixedly while facing a portion of the disk 110. Consequently, the slit tracks SA, SI1, SI2 and the optical module 120 move relatively to each other in the measurement direction (the direction of arrow C shown in FIG. 3; hereinafter suitably referred to as "measurement direction C") as the motor M is driven.

Here, the "measurement direction" is the measurement direction when the respective slit tracks formed on the disk 110 by the optical module 120 are optically measured. In a rotary-type encoder in which the object to be measured is the disk 110 as in this embodiment, the measurement direction agrees with the circumferential direction with the center axis of the disk 110 as its center, but is the direction along a linear scale in a linear-type encoder in which the object to be measured is a linear scale and a mover moves with respect to a stator. Note that the "center axis" is the rotational axis of the disk 110, and agrees with the axis AX of the shaft SH in a case where the disk 110 and the shaft SH are coaxially connected.

2-2. Optical Detecting Mechanism

The optical detecting mechanism comprises the slit tracks SA, SI1, SI2 and the optical module 120. The respective slit tracks are formed as tracks disposed in a ring shape with the disk center O as its center on the upper surface of the disk 110. Each of the slit tracks comprises a plurality of reflection slits (the sections shaded by slashes in FIG. 4) arranged side by side across the entire circumference of the track along the measurement direction C. Each reflection slit reflects light irradiated from a light source 121. Note that the light source 121 corresponds to one example of means for emitting diffusion light to the plurality of slit tracks.

2-2-1. Disk

The disk 110 is formed by a material that reflects light, such as metal, for example. Then, a material with low reflectance (such as chromium oxide, for example) is disposed onto sections where light is not to be reflected on the surface of the disk 110 by a coating process or the like, thereby forming reflection slits in sections where the material is not disposed. Note that the reflection slits may also be formed by creating a coarse surface on the sections where light is not to be reflected by sputtering or the like, thereby reducing reflectance.

Further, the material, manufacturing method, and the like of the disk 110 are not particularly limited. For example, the disk 110 may be formed using a material that transmits light, such as glass or transparent resin. In this case, the reflection slits can be formed by disposing a material that reflects light (such as aluminium, for example) on the surface of the disk 110 by vapour deposition or the like.

Three slit tracks are arranged on the upper surface of the disk 110 in the width direction (the direction of arrow R shown in FIG. 3; hereinafter suitably referred to as "width direction R"). Note that the "width direction" is the radial direction of the disk 110, i.e., the direction substantially orthogonal to the measurement direction C, and the length of each slit track along this width direction R corresponds to the width of each slit track. The three slit tracks are concentrically disposed in the order of SA, SI1, SI2, from the inside toward the outside in the width direction R. In order to explain the respective slit tracks in further detail, FIG. 4 shows a partially enlarged view of the vicinity of an area of the disk 110 facing the optical module 120.

Figure 4:
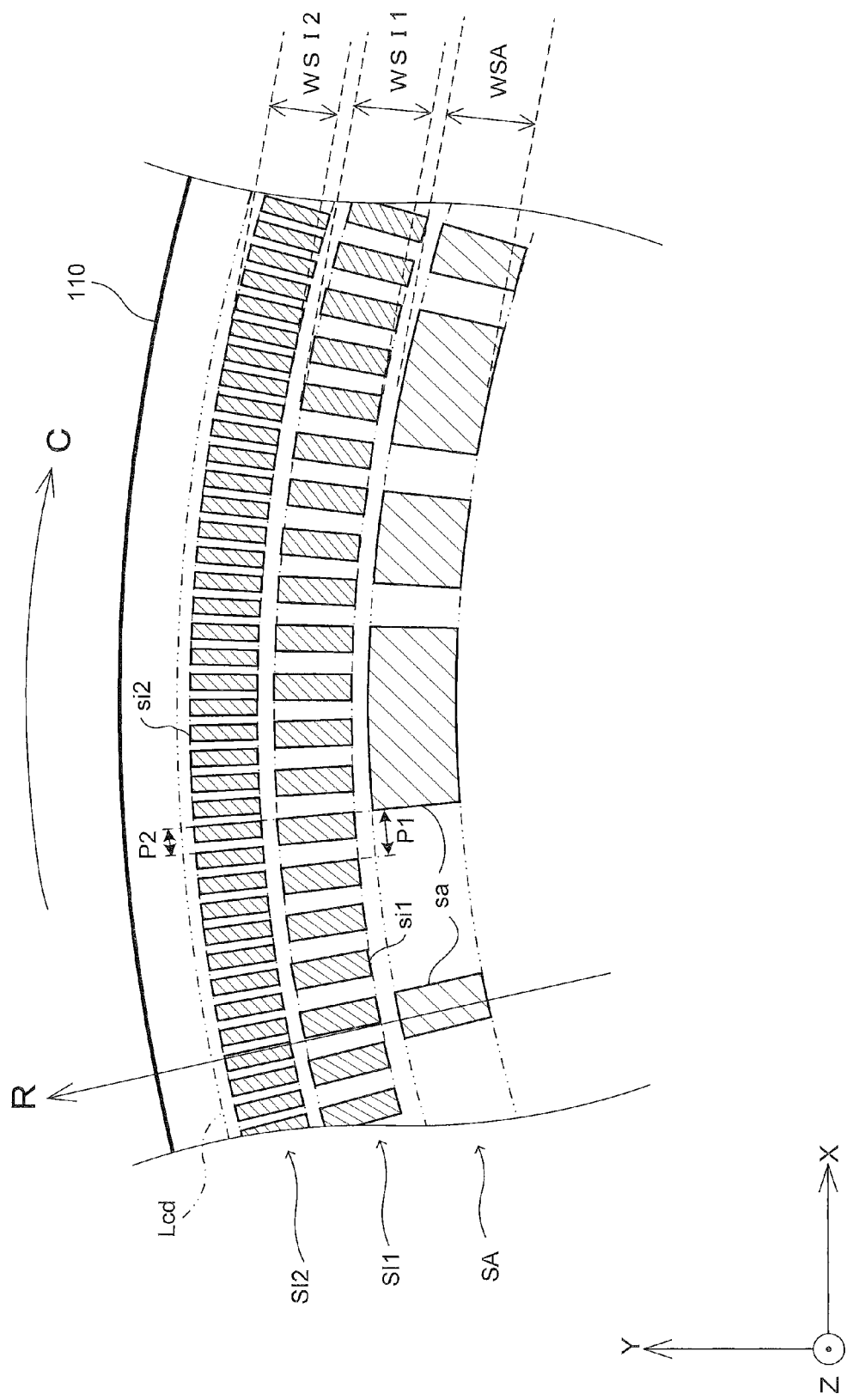
FIG. 4 is an explanatory view for explaining a slit track related to the embodiment.

As shown in FIG. 4, a plurality of reflection slits sa included in the slit track SA is disposed along the entire circumference of the disk 110 so as to comprise an absolute pattern in the measurement direction C.

Note that the "absolute pattern" is a pattern in which the positions, proportions, and the like of the reflection slits within an angle in which the light-receiving arrays of the optical module 120 described later face each other are uniquely defined within one rotation of the disk 110. That is, for example, if the motor M is in a certain angular position in the case of the example of the absolute pattern shown in FIG. 4, a combination of bit patterns resulting from detection or non-detection by each of the plurality of light-receiving elements of the light-receiving arrays facing each other uniquely represents the absolute position of the angular position. Note that the "absolute position" refers to an angular position with respect to the origin within one rotation of the disk 110. The origin is set in a suitable angular position within one rotation of the disk 110, and the absolute pattern is formed with this origin as a reference.

Note that, according to an example of this pattern, it is possible to generate a pattern that one-dimensionally represents the absolute position of the motor M by bits in the number of light-receiving elements of the light-receiving array. However, the absolute pattern is not limited to this example. For example, the pattern may be a pattern multi-dimensionally represented by bits in the number of light-receiving elements. Further, other than a predetermined bit pattern, the pattern may be a pattern in which a physical quantity, such as a phase or amount of light received by the light-receiving elements, changes so as to uniquely represent the absolute position, a pattern in which a code sequence of an absolute pattern modulates, or other various patterns.

On the other hand, a plurality of reflection slits si1, si2 respectively included in the slit tracks SI1, SI2 is disposed along the entire circumference of the disk 110 so as to comprise an incremental pattern in the measurement direction C.

The "incremental pattern" is a pattern repeated regularly at a predetermined pitch, as shown in FIG. 4. Here, "pitch" refers to the disposed interval of the respective reflection slits si1, si2 of the slit tracks SI1, SI2 that comprise an incremental pattern. As shown in FIG. 4, the pitch of the slit track SI1 is P1, and the pitch of the slit track SI2 is P2. The incremental pattern, unlike the absolute pattern that represents the absolute position by the bits corresponding to detection or non-detection by the plurality of light-receiving elements, represents the position of the motor M for each pitch or within one pitch by the sum of the detection signals resulting from at least one or more of the light-receiving elements. Consequently, the incremental pattern does not represent the absolute position of the motor M, but can represent the position with very high accuracy compared to the absolute pattern.

According to this embodiment, the pitch P1 of the slit track SI1 is set longer than the pitch P2 of the slit track SI2. According to this embodiment, each pitch is set so that P1=2×P2. That is, the number of reflection slits si2 of the slit track SI2 is two times the number of the reflection slits si1 of the slit track SI1. Nevertheless, the relationship of this slit pitch is not limited to this example, and can take various values, such as three times, four times, and five times, for example.

Note that, according to this embodiment, the minimum length of the reflection slit sa of the slit track SA in the measurement direction C agrees with the pitch P1 of the reflection slit si1 of the slit track SI1. As a result, the resolution of the absolute signal based on the slit track SA agrees with the number of the reflection slits si1 of the slit track SI1. Nevertheless, the minimum length is not limited to this example, and the number of the reflection slits si1 of the slit track SI1 is preferably set greater than or equal to the resolution of the absolute signal.

2-2-2. Optical Module

Figure 5:
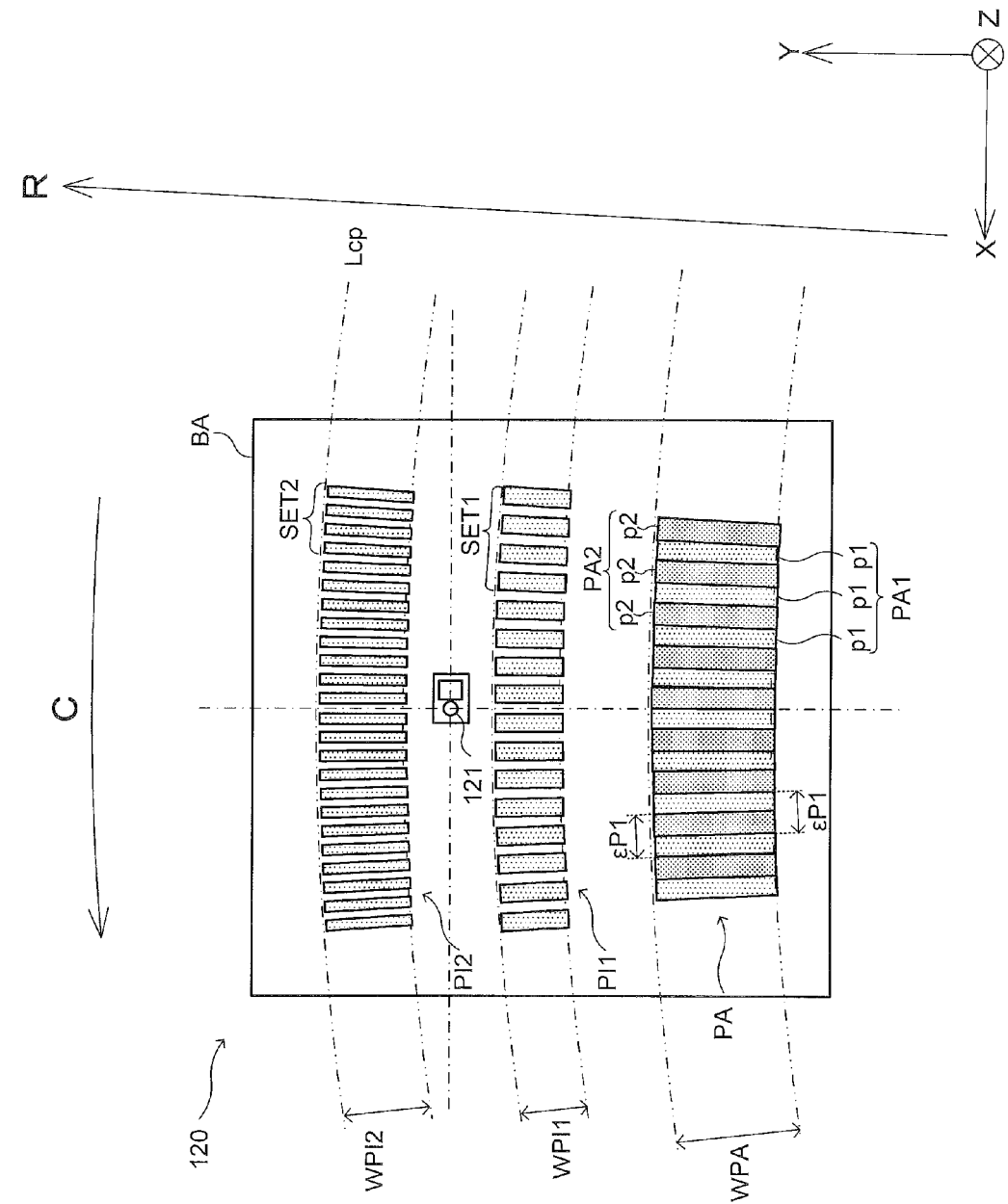
FIG. 5 is an explanatory view for explaining an optical module and a light-receiving array related to the embodiment.

The optical module 120, as shown in FIG. 2 and FIG. 5, is formed as one substrate BA parallel to the disk 110. With this arrangement, the encoder 100 can be thinned and the structure of the optical module 120 can be simplified. Consequently, the optical module 120 relatively moves with respect to the slit tracks SA, SI1, SI2 in the measurement direction C, accompanying the rotation of the disk 110. Note that the optical module 120 does not necessarily need to be configured as one substrate BA, allowing each component to be configured as a plurality of substrates. In this case, these substrates may be collectively disposed. Further, the optical module 120 does not need to be in the form of a substrate.

The optical module 120, as shown in FIG. 2 and FIG. 5, comprises the light source 121, and a plurality of light-receiving arrays PA, PI1, PI2 on the surface of the substrate BA facing the disk 110.

As shown in FIG. 3, the light source 121 is disposed in a position facing the area between the slit track SI1 and the slit track SI2. Then, the light source 121 emits light onto the sections facing the three slit tracks SA, SI1, SI2 that pass through the positions facing the optical module 120.

The light source 121 is not particularly limited as long as it is a light source capable of irradiating the irradiation area with light, allowing use of a light emitting diode (LED), for example. The light source 121 is particularly configured as a point light source in which no optical lens or the like is disposed, and emits diffusion light from a light-emitting part. Note that, when referring to a "point light source," the light source does not need to be strictly a point, and the light may be emitted from an emission surface comprising a finite surface area as long as the light source is regarded as capable of emitting diffusion light from a substantially point-like position from the standpoint of design and operation principles. Further, the "diffusion light" is not limited to light emitted from a point light source toward all directions, but includes light that is diffused and emitted toward a certain finite direction. That is, the term "diffusion light" used here includes any light that comprises more diffusibility than parallel light. By using a point light source in this manner, it is possible for the light source 121 to substantially uniformly irradiate the three slit tracks SA, SI1, SI2 that pass through the positions facing thereto with light. Further, collecting and diffusing of light by an optical element are not performed, and therefore errors and the like caused by the optical element are unlikely to occur, making it possible to increase the straightness of light toward the slit tracks.

The plurality of the light-receiving arrays PA, PI1, PI2 is disposed along the circumference of the light source 121, and comprises a plurality of light-receiving elements (the sections shaded by dots in FIG. 5), each which receives light reflected by the reflection slits of the slit tracks correspondingly associated thereto. The plurality of light-receiving elements is arranged side by side along the measurement direction C, as shown in FIG. 5.

Note that the light emitted from the light source 121 is diffusion light. Consequently, the image of the slit tracks projected onto the optical module 120 is an image magnified by a predetermined magnifying power $\epsilon$ in accordance with the optical path length. That is, as shown in FIG. 4 and FIG. 5, given WSA, WSI1, WSI2 as the respective lengths of the slit tracks SA, SI1, SI2 in the width direction R and WPA, WPI1, WPI2 as the lengths of the shapes of the reflection light projected onto the optical module 120 in the width direction R, WPA, WPI1, WPI2 are lengths corresponding to $\epsilon$ times WSA, WSI1, WSI2. Note that this embodiment shows an example in which the lengths of the light-receiving elements of the respective light-receiving arrays in the width direction R are set substantially equal to the shape of the respective slits projected onto the optical module 120, as shown in FIG. 5. However, the lengths of the light-receiving elements in the width direction R are not necessarily limited to this example.

Similarly, the measurement direction C in the optical module 120 is also the shape of the measurement direction C in the disk 110 projected onto the optical module 120, that is, the shape affected by the magnifying power E. In order to make understanding easier, the following provides a detailed explanation using the measurement direction C in the position of the light source 121 as an example, as shown in FIG. 2. The measurement direction C in the disk 110 is circular in shape, with the axis AX as a center. Conversely, the center of the measurement direction C projected onto the optical module 120 is located in a position separated from an optical center Op, which is in a position within the plane of the disk 110 on which the light source 121 is disposed, by a distance $\epsilon L$. The distance $\epsilon L$ is a distance L between the axis AX and optical center Op magnified by the magnifying power $\epsilon$. This position is conceptually illustrated in FIG. 2 as a measurement center Os. Consequently, the measurement direction C in the optical module 120 is on a line having the measurement center Os separated by the distance $\epsilon L$ from the optical center Op on a line on which the optical center Op and the axis AX are located in the direction of the axis AX as a center and the distance $\epsilon L$ as a radius.

In FIG. 4 and FIG. 5, the correspondence relationship of the measurement direction C in the disk 110 and the optical module 120 is represented by arc-shaped lines Lcd, Lcp. The line Lcd shown in FIG. 4 represents a line on the disk 110 along the measurement direction C, and the line LCP shown in FIG. 5 represents a line on the substrate BA along the measurement direction C (the line Lcd projected onto the optical module 120).

As shown in FIG. 2, given G as a gap length between the optical module 120 and the disk 110, and $\Delta d$ as an amount of protrusion of the light source 121 from the substrate BA, the magnifying power $\epsilon$ is expressed by the following (Formula 1).

$$\epsilon = (2G - \Delta d)/(G - \Delta d) \qquad \text{(Formula 1)}$$

As each light-receiving element, a photodiode, for example, can be used. However, the light-receiving element is not limited to a photodiode and is not particularly limited as long as it is capable of receiving light emitted from the light source 121 and converting the light into an electric signal.

The light-receiving array in this embodiment is disposed correspondingly to the three slit tracks SA, SI1, SI2. The light-receiving array PA is configured to receive the light reflected by the slit track SA. Further, the light-receiving array PI1 is configured to receive the light reflected by the slit track SI1, and the light-receiving array PI2 is configured to receive the light reflected by the slit track SI2.

The light source 121, the light-receiving array PA, and the light-receiving arrays PI1, PI2 are disposed in the positional relationship shown in FIG. 5. That is, both light-receiving array PI1 and the light-receiving array PA are disposed further on the direction side where the light source 121 rather than the light-receiving array PI2 is disposed. Further, the light source 121 is disposed between the light-receiving array PI1 and the light-receiving array PA as well as the light-receiving array PI2. Then, the light-receiving array PI1, the light-receiving array PA, and the light source 121 are disposed further on the inner circumference side than the light-receiving array PI2 (the center axis side). As a result, the light source 121 and the respective light-receiving arrays are disposed in the order of the light-receiving array PI2, the light source 121, the light-receiving array PI1, and the light-receiving array PA, from the outside toward the inside in the width direction R (from the outside toward the center axis of the circle).

The light-receiving array PA corresponding to the absolute pattern comprises two types of light-receiving arrays PA1, PA2. Light-receiving elements p1, p2 included in each of these light-receiving arrays PA1, PA2 are alternately disposed along the measurement direction C (line Lcp), configuring the two light-receiving arrays PA1, PA2 as the light-receiving array PA of a single track. The light-receiving arrays PA1, PA2 respectively receive the reflection light from the slit track SA, thereby generating an absolute signal comprising a bit pattern in the number of light-receiving elements. Note that the light-receiving array PA corresponds to one example of the third light-receiving array, and also to one example of means for receiving light reflected by the slit track comprising an absolute pattern.

In this example, the disposed pitch of the light-receiving element p1 and the disposed pitch of the light-receiving element p2 both correspond to a minimum length (pitch P1) of the reflection slit sa of the slit track SA in the measurement direction C (the minimum length of the projected image; that is $\epsilon \times P1$), and the length of each of the light-receiving elements p1, p2 in the measurement direction C agrees with one-half of $\epsilon \times P1$. With this arrangement, the light-receiving arrays PA1, PA2 are offset against each other by a length equivalent to one-half of one bit in the measurement direction C (equivalent to one-half of the pitch P1). Note that the length of each of the light-receiving elements p1, p2 in the measurement direction C is not limited to the above, and may be a length other than one-half of $\epsilon \times P1$.

As a result, the following advantages are achieved. If the light-receiving array PA were not to comprise the light-receiving arrays PA1, PA2 offset in the measurement direction, in other words, if the light-receiving array PA were configured as one type of light-receiving array comprising a plurality of light-receiving elements, possibilities such as the following exist. That is, if the absolute position is represented by a one-dimensional absolute pattern such as in this embodiment, the detection accuracy of the absolute position may decrease in the area of a change in the bit pattern resulting from the respective light-receiving elements of the light-receiving array PA being positioned facing the vicinity of an end area of the reflection slits. According to this embodiment, since the light-receiving arrays PA1, PA2 are offset by a length equivalent to one-half of one bit, the absolute position is calculated using the detection signal from the light-receiving array PA2 or the opposite operation is performed when, for example, the absolute position by the light-receiving array PA1 corresponds to a change point in the bit pattern. As a result, it is possible to improve the detection accuracy of the absolute position. Note that, while the amount of received light in the two light-receiving arrays PA1, PA2 needs to be uniform in the case of such a configuration, the two light-receiving arrays PA1, PA2 are disposed substantially equidistant from the light source 121 according to this embodiment, making it possible to achieve the above described configuration.

The light-receiving array PI1 corresponding to the incremental pattern is disposed between the light-receiving array PA and the light source 121. Further, the light-receiving array PI2 corresponding to the incremental pattern is disposed further on the outer circumference side than the light source 121. The light-receiving array PI1 is disposed further on the inner circumference side than the light-receiving array PI2. Further, the distances between each of the light-receiving arrays PI1, PI2 and the light source 121 are substantially equal. That is, the light-receiving arrays PI1, PI2 are basically formed into an axisymmetrical shape with the line on the width direction R and the line on the measurement direction C that pass through the light source 121 as the axes of symmetry (excluding the curved shape with the measurement center Os as the center). Note that the light-receiving array PI2 corresponds to one example of the first light-receiving array, and also to one example of means for receiving light reflected by the slit track comprising an incremental pattern. Further, the light-receiving array PI1 corresponds to one example of the second light-receiving array, and also to one example of means for receiving light reflected by the slit track comprising an incremental pattern that is longer in pitch than other incremental patterns.

This embodiment illustrates a one-dimensional pattern as the absolute pattern, and therefore the light-receiving arrays PA1, PA2 of the light-receiving array PA corresponding thereto comprise a plurality (nine, for example, in this embodiment) of light-receiving elements p1, p2 arranged side by side along the measurement direction C (line Lcp) so as to respectively receive the light reflected by the reflection slit sa of the slit track SA correspondingly associated thereto. This plurality of light-receiving elements p1, p2 handles whether or not light is received as a bit as described above, and represents the absolute position of nine bits in total. Consequently, a light reception signal received by each of the plurality of light-receiving elements p1, p2 is handled independently in the position data generating part 130, and the absolute position encrypted (coded) into a serial bit pattern is decoded from the combination of these light reception signals. The light reception signal of the light-receiving arrays PA1, PA2 is referred to as an "absolute signal." Note that, in a case where an absolute pattern that differs from that in this embodiment is used, the light-receiving arrays PA1, PA2 become a configuration corresponding to that pattern.

The light-receiving arrays PI1, PI2 comprise a plurality of light-receiving elements arranged side by side along the measurement direction C (line Lcp) so as to respectively receive light reflected by the reflection slits si1, si2 of the slit tracks SI1, SI2 correspondingly associated thereto. First, the light-receiving array is explained using the light-receiving array PI1 as an example.

According to this embodiment, sets of a total of four light-receiving elements (represented by "SET1" in FIG. 5) are arranged side by side in one pitch (one pitch in the projected image; that is, $\epsilon \times P1$) of the incremental pattern of the slit track SI1, and sets of the four light-receiving elements are further arranged side by side in a plurality along the measurement direction C. Then, since the incremental pattern forms reflection slits repeatedly on a per pitch basis, each of the light-receiving elements generates a periodic signal of one period (referred to as 360° in terms of electric angle) in one pitch when the disk 110 rotates. Then, since four light-receiving elements are disposed in one set corresponding to one pitch, the light-receiving elements adjacent to each other in one set detect periodic signals comprising a phase difference of 90° from each other. The respective light reception signals are referred to as an A-phase signal, a B-phase signal (with a phase difference of 90° from the A-phase signal), a bar A-phase signal (with a phase difference of 180° from the A-phase signal), and a bar B-phase signal (with a phase difference of 180° from the B-phase signal).

The incremental pattern represents a position in one pitch, and therefore the signal in each phase in one set and the signal in each phase in another set corresponding thereto have values that change in the same manner. Consequently, the signals in the same phase are added across a plurality of sets. Consequently, from a large number of light-receiving elements of the light-receiving array PI1 shown in FIG. 5, four signals shifted from one another by a phase of 90° are detected.

On the other hand, the light-receiving array PI2 is also configured in the same manner as the light-receiving array PI1. That is, sets of a total of four light-receiving elements (represented by "SET2" in FIG. 5) are arranged side by side in one pitch (one pitch in the projected image; that is, $\epsilon \times P2$) of the incremental pattern of the slit track SI2, and sets of four light-receiving elements are arranged side by side in a plurality along the measurement direction C. Consequently, four signals shifted from one another by a phase of 90° are respectively generated from the light-receiving arrays PI1, PI2. These four signals are referred to as "incremental signals." Further, the incremental signals generated from the light-receiving array PI2 corresponding to the slit track SI2 with a short pitch are referred to as "high incremental signals" since the resolution is high compared to other incremental signals, and the incremental signals generated by the light-receiving array PI1 corresponding to the slit track SI1 with a long pitch are referred to as "low incremental signals" since the resolution is low compared to other incremental signals.

Note that while this embodiment describes an illustrative scenario in which four light-receiving elements are included in one set corresponding to one pitch of the incremental pattern, the number of light-receiving elements in one set is not particularly limited thereto, such as a case where two light-receiving elements are included in one set, for example.

2-3. Position Data Generating Part

The position data generating part 130 acquires two absolute signals, each comprising the bit pattern representing the absolute position, and high incremental signals and low incremental signals that include four signals shifted from one another by a phase of 90°, from the optical module 120, at the timing in which the absolute position of the motor M is measured. Then, based on the acquired signals, the position data generating part 130 calculates the absolute position of the motor M represented by these signals, and outputs position data representing the calculated absolute position to the controller CT.

Note that, as for the method for generating the position data by the position data generating part 130, various methods can be used without particular limitation. As an example, the following describes a case where the absolute position is calculated from the high incremental signal and the low incremental signal as well as the absolute signal, and the position data is then generated.

Figure 6:
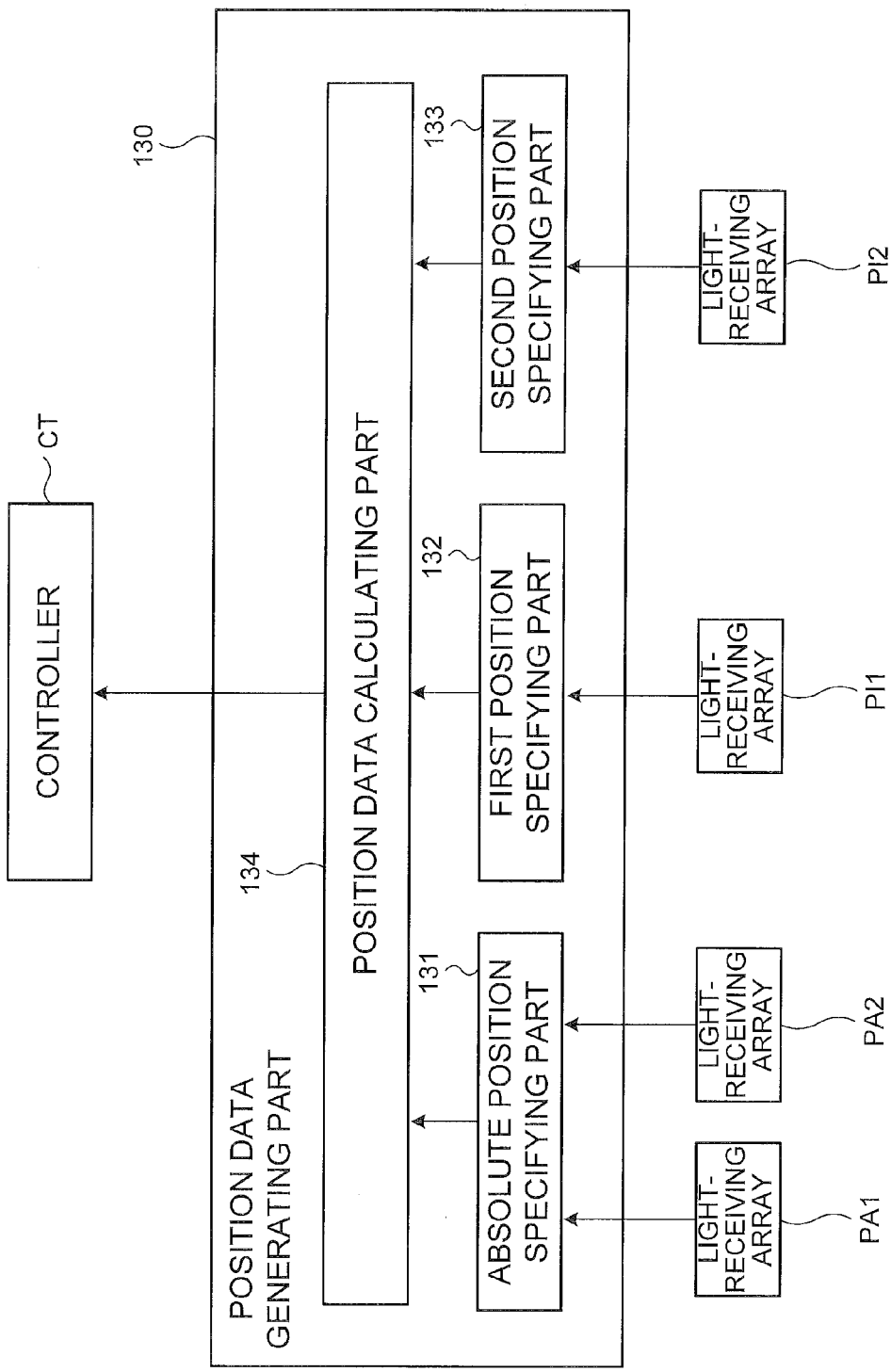
FIG. 6 is an explanatory view for explaining a position data generating part related to the embodiment.

As shown in FIG. 6, the position data generating part 130 comprises an absolute position specifying part 131, a first position specifying part 132, a second position specifying part 133, and a position data calculating part 134. The absolute position specifying part 131 binarises each absolute signal from the light-receiving arrays PA1, PA2, and converts the signals into bit data representing the absolute position. Then, the absolute position specifying part 131 specifies the absolute position based on the correspondence relationship between predefined bit data and the absolute position.

On the other hand, of the low incremental signals of the respective four phases from the light-receiving array PI1, the first position specifying part 132 subtracts the low incremental signals with a phase difference of 180° from each other. By subtracting the signals with a phase difference of 180°, it is possible to cancel out the manufacturing errors, measurement errors, and the like of the reflection slit within one pitch. As described above, the signals resulting from the subtraction are referred to as a "first incremental signal" and a "second incremental signal" here. The first incremental signal and the second incremental signal comprise a phase difference of 90° from each other by electric angle (simply referred to as "A-phase signal," "B-phase signal," and the like). Then, the first position specifying part 132 specifies a position within one pitch from these two signals. The method for specifying a position within one pitch is not particularly limited. For example, in a case where the low incremental signal, which is a periodic signal, is a sinusoidal signal, an example of the above described specification method is to calculate an electric angle $\phi$ by performing the arc tangent operation on the result of division of the two sinusoidal signals in the A phase and B phase. Or, there is also a method for converting the two sinusoidal signals into an electric angle $\phi$ using a tracking circuit. Or, there is also a method for specifying an electric angle $\phi$ correspondingly associated with the values of signals in the A phase and B phase in a table created in advance. At this time, it is preferable for the first position specifying part 132 to convert the two sinusoidal signals in the A phase and B phase from analogue to digital on a per detection signal basis.

The position data calculating part 134 superimposes the position within one pitch specified by the first position specifying part 132 onto the absolute position specified by the absolute position specifying part 131. With this arrangement, it is possible to calculate an absolute position with higher resolution than an absolute position based on an absolute signal. According to this embodiment, the resolution of this calculated absolute position agrees with the number of slits of the slit track SI2 with a short pitch. That is, in this example, the resolution of the calculated absolute position is two times the resolution of an absolute position based on an absolute signal.

On the other hand, the second position specifying part 133 performs the same processing as the aforementioned first position specifying part 132 on the high incremental signals from the light-receiving array PI2, and specifies a highly accurate position within one pitch from the two signals. Then, the position data calculating part 134 superimposes the position within one pitch specified by the second position specifying part 133 onto the absolute position calculated based on the aforementioned low incremental signals. With this arrangement, it is possible to calculate an absolute position that has even higher resolution than the absolute position calculated based on low incremental signals.

The position data calculating part 134 performs multiplication processing on the absolute position thus calculated to further improve the resolution, and outputs the result as position data representing a highly accurate absolute position to the controller CT. The method for specifying a high resolution absolute position from a plurality of position data with different resolutions in this manner is referred to as the "stacking-up method."

3. Examples of Advantages of this Embodiment

According to this embodiment, the encoder 100 comprises the slit track SI2 comprising one incremental pattern, and the slit track SI1 comprising an incremental pattern that is longer in pitch than the other incremental pattern. Then, the light-receiving array PI2 is configured to receive the light reflected by the slit track SI2, and the light-receiving arrays PI1 is configured to receive the light reflected by the slit track SI1 with a long pitch. That is, the encoder 100 comprises a plurality of types of slit tracks SI1, SI2, each comprising an incremental pattern that differs in pitch, and a plurality of light-receiving arrays PI1, PI2 configured to receive the light therefrom. With this arrangement, it is possible to generate position data representing a high-resolution absolute position by the multiplication stacking-up method that stacks up the multiplication processing of the signal of the light-receiving array PI1 and the multiplication processing of the signal of the light-receiving array PI2, thereby making it possible to achieve high resolution.

Further, in the multiplication stacking-up method, the number of slits of the slit track SI1 corresponding to the light-receiving array PI1 is made to agree with the resolution of the absolute signal of the light-receiving array PA, and the multiplication processing is stacked up to increase the resolution of the encoder 100. Therefore, in order to make the phases of the signals of the light-receiving array PI1 and the light-receiving array PA agree, it is necessary to position both of the light-receiving arrays PI1, PA with high accuracy.

According to this embodiment, the light-receiving array PI1 and the light-receiving array PA are disposed further on the direction side where the light source 121 rather than the light-receiving array PI2 is disposed. With this arrangement, it is possible to dispose the light-receiving array PH and the light-receiving array PA in close proximity, thereby making the alignment when forming both of the light-receiving arrays PI1, PA on the substrate BA and when positioning the optical module 120 with respect to the disk 110 extremely easy, significantly improving the fabricability of the encoder 100. Further, compared to a case where both of the light-receiving arrays PI1, PA are separated, the effect by mechanical displacement resulting from attachment errors (eccentricity of the disk 110, etc.) and manufacturing errors is decreased, making it possible to enhance the robustness with respect to mechanical displacement.

Figure 7:
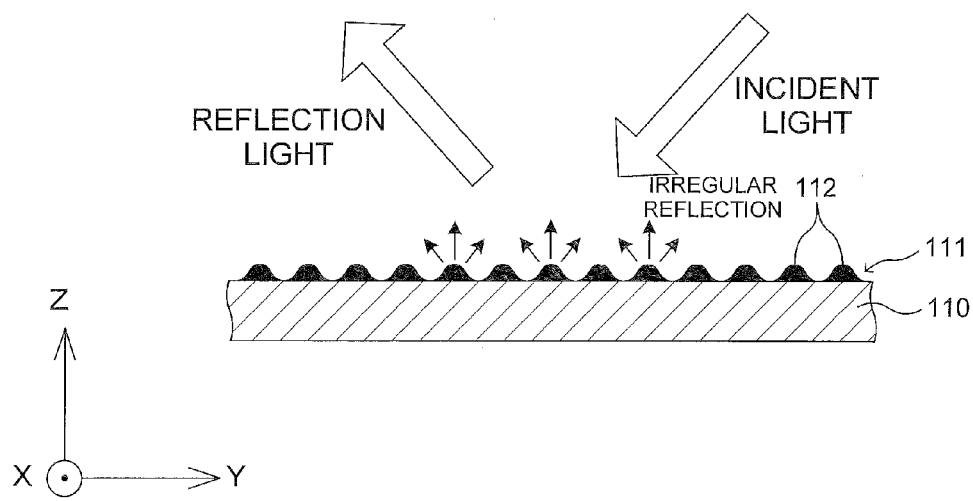
FIG. 7 is an explanatory view for explaining an irregular reflection caused by an unevenness of the disk surface related to the embodiment.

Further, in particular, according to this embodiment, the following advantages are achieved. As shown in FIG. 7, a large amount of minute unevenness exists on the surface of a material 111 of the disk 110, which causes the light emitted from the light source 121 to produce irregular reflection (scattering) when reflected by the disk 110.

Figure 8:
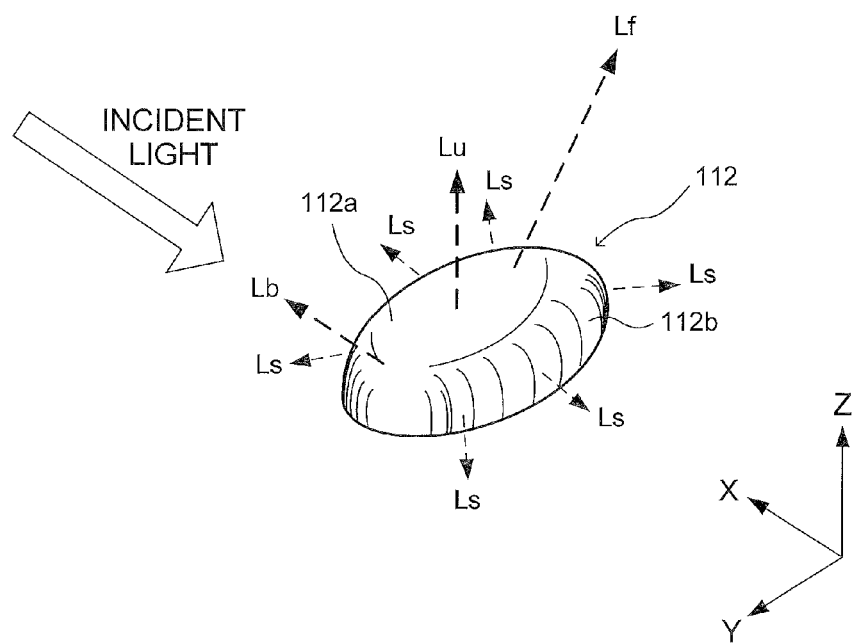
FIG. 8 is an explanatory view for explaining a directivity of the irregular reflection components caused by convex parts.

FIG. 8 conceptually shows an example of the shape of a convex part 112 in the minute unevenness of the material 111. Note that, in FIG. 8, the length of each arrow of the irregular reflection component represents the size of intensity. In the example shown in FIG. 8, the convex part 112 comprises an upper surface 112a, and an inclined side surface 112b that surrounds the circumference of the upper surface 112a. The upper surface 112a, with its relatively flat shape, has a large surface area where the incident light is irradiated diagonally from above (the positive side along the Y axis and the positive side along the Z axis in this example), but the side surface 112b, being slanted, has a small surface area where the incident light is irradiated. As a result, the intensity of the irregular reflection component produced by the incident light is relatively high for a frontward scattering component Lf, an upward scattering component Lu, and a rearward scattering component Lb scattered by the upper surface 112a, and relatively low for a sideways scattering component Ls scattered by the side surface 112b in the circumferential direction, as shown in FIG. 8. Further, of the frontward scattering component Lf, the upward scattering component Lu, and the rearward scattering component Lb, the intensity of the frontward scattering component Lf scattered in the regular reflection direction is highest, and the intensity of upward scattering component Lu scattered upward and the rearward scattering component Lb scattered in the direction reverse from the advancing direction of the incident light is intermediate (higher than the sideways scattering component Ls). Consequently, the distribution of the irregular reflection components as a whole is dominant in the direction along the Y-Z plane.

Figure 9:
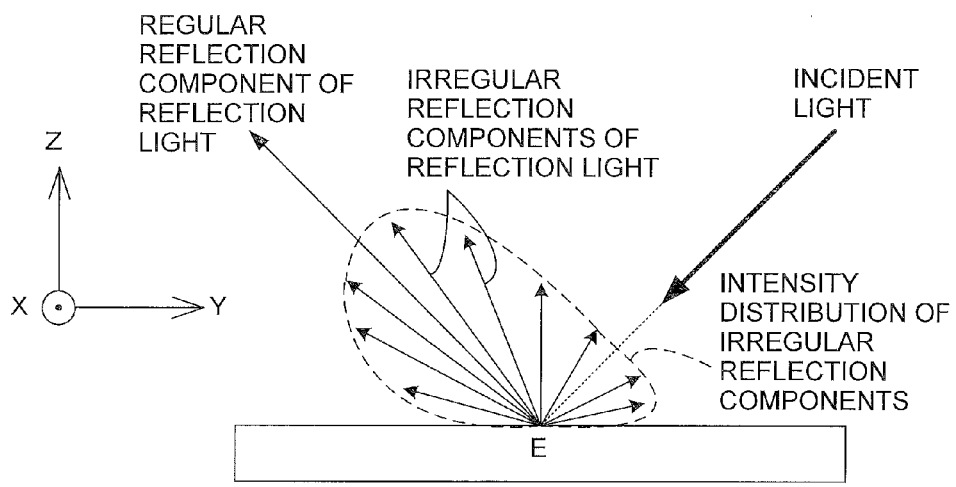
FIG. 9 is an explanatory view for explaining an intensity distribution of the irregular reflection components as viewed from a positive direction along an X axis.
Figure 10:
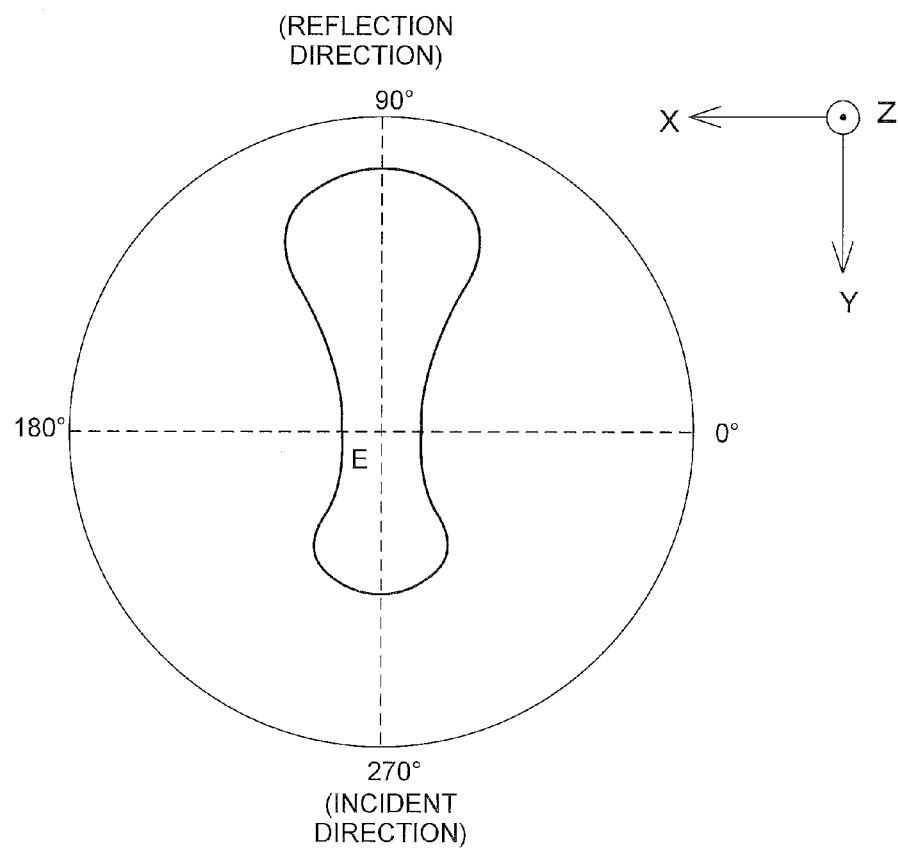
FIG. 10 is an explanatory view for explaining an intensity distribution of the irregular reflection components as viewed from a positive direction along a Z axis.

FIG. 9 shows the intensity distribution of the irregular reflection components as viewed from the positive direction along the X axis, and FIG. 10 shows the intensity distribution of the irregular reflection components as viewed from the positive direction along the Z axis. Note that the length of each arrow in FIG. 9 and the distance from point E in FIG. 10 represent the size of intensity, respectively. Due to the irregular reflection by the aforementioned convex part 112, the intensity distribution of the irregular reflection components on the surface of the disk 110 where a large number of minute convex parts 112 exists forms a shape that is longer in the direction along the plane which includes the advancing direction of the light (the Y-Z plane in this example), and comprises directivity in the direction along the Y axis as a whole, as shown in FIG. 9 and FIG. 10. More specifically, as shown in FIG. 10, this intensity distribution of the irregular reflection components is a substantially 8-shaped distribution wherein two circles arranged side by side in the advancing direction of the light are connected, with the reflection position E as the center, and the circle on the advancing direction far side of the light in particular forms a distribution shape that is larger than the circle on the advancing direction near side. That is, in a case where two light-receiving arrays are disposed in the same direction, with the light source 121 as reference in the optical module 120, crosstalk in which, for example, the scattered light in the reflection light that should reach one light-receiving array reaches the other light-receiving array, occurs between both light-receiving arrays, causing noise. Then, the light-receiving array that is farther away from the light source 121 receives a greater amount of irregular reflection components of the light than the light-receiving array that is closer to the light source 121, sometimes producing even greater noise.

On the other hand, in general, the absolute signal output from the light-receiving array PA that receives the light reflected by the slit track SA comprising an absolute pattern is not a repetition signal (sinusoidal, etc.), unlike the incremental signal, making it difficult to reduce the noise resulting from the irregular reflection components of the light to be received by the light-receiving array PA being received by another light-receiving array by a filter. As a result, it is preferable to avoid the travel of noise from the light-receiving array PA to other light-receiving arrays, to the extent possible. In particular, the signal of the light-receiving array PI2 is what determines the resolution of the encoder 100 in the end, and therefore the travel of the noise to the light-receiving array PI2 is preferably decreased to the extent possible.

According to this embodiment, the light source 121 is disposed between the light-receiving array PH and the light-receiving array PA as well as the light-receiving array PI2. That is, the light-receiving array PI2 is not disposed on the extended line of the segment that connects the light source 121 and the light-receiving array PA on the light-receiving array PA side. Consequently, based on the intensity distribution of the irregular reflection components of the light, it is possible to suppress the travel of noise from the light-receiving array PA to the light-receiving array PI2, making it possible to increase the reliability of the encoder 100.

Further, according to this embodiment, the light-receiving array PH and the light-receiving array PI2 are each disposed on opposite sides, sandwiching the light source 121. With this arrangement, the irregular reflection components from the light-receiving array PI1 to the light-receiving array PI2 are decreased based on the aforementioned intensity distribution of the irregular reflection components of the light, making it possible to suppress the travel of noise to the light-receiving array PI2. Consequently, it is possible to improve the detection accuracy and increase the reliability of the encoder 100.

Further, advantages such as the following are also achieved. That is, in general, with the light-receiving array disposed away from the light source, the amount of received light is reduced. When the light-receiving surface area is increased in order to maintain the amount of received light, the junction capacitance of the respective light-receiving elements increases, decreasing signal responsiveness. Further, if the amount of received light is reduced, signal responsiveness similarly decreases even if the gain is increased on the circuit side.

On the other hand, in a case where the multiplication processing of the signal of the light-receiving array PI1 and the multiplication processing of the signal the light-receiving array PI2 are stacked up as in this embodiment, the accuracy of the final absolute position of the encoder 100 is relatively highly affected by the responsiveness of the signal output from the light-receiving array PI2. Consequently, the disposed position of the light-receiving array PI2 is an important factor in accuracy improvement. According to this embodiment, the light source 121 is disposed between the light-receiving array PH and the light-receiving array PA as well as the light-receiving array PI2. With this arrangement, the light-receiving array PI2 having a relatively large effect on the accuracy of the absolute position can be arranged near the light source 121, making it possible to improve responsiveness. Further, the amount of received light of the light-receiving array PI2, which requires accuracy, can be increased, making it possible to improve the accuracy of the absolute position.

Further, according to this embodiment, the light source 121 is disposed between the light-receiving array PI1 and the light-receiving array PA as well as the light-receiving array PI2. With this arrangement, the width direction dimension is not regulated in the adjacent light-receiving array PA as in the light-receiving array PI1, making it possible to lengthen the width direction dimension of the light-receiving array PI2 to a greater degree than the other light-receiving array PI1. As a result, the amount of received light of the light-receiving array PI2 that determines resolution can be increased, making it possible to improve detection accuracy.

Further, according to this embodiment, the light source 121 is disposed between the light-receiving array PI1 and the light-receiving array PA as well as the light-receiving array PI2. With this arrangement, the light source 121 is not disposed between the light-receiving array PI1 and the light-receiving array PA, making it possible to dispose the light-receiving array PI1 and the light-receiving array PA in close proximity. As a result, it is possible to further improve the fabricability of the encoder 100, and further enhance the robustness with respect to mechanical displacement, such as attachment errors and manufacturing errors.

Further, in particular, according to this embodiment, the following advantages are achieved. That is, the detection error resulting from the eccentricity of the disk 110 generally tends to be dependent on the radius of the slit track, increasing when the radius is small and decreasing when the radius is large.

According to this embodiment, the light-receiving array PI1, the light-receiving array PA, and the light source 121 are disposed further on the inner circumference side than the light-receiving array PI2. That is, the light-receiving array PI2 is disposed on the outermost circumference side, making it possible to increase the radius of the slit track SI2 corresponding to the light-receiving array PI2 of the disk 110 the most. Consequently, the detection error resulting from the eccentricity of the light-receiving array PI2 can be decreased, and the robustness with respect to the eccentricity can be enhanced. Further, there is also the advantage that the pitch of the slit track SI2 corresponding to the light-receiving array PI2 can be maintained as large as possible.

Further, in particular, according to this embodiment, the following advantages are achieved. That is, in the absolute signal output from the light-receiving array PA that receives the light reflected by the slit track SA comprising an absolute pattern, the bit pattern resulting from detection or non-detection by each of the plurality of light-receiving elements uniquely represents an absolute position. On the other hand, in the incremental signal output from the light-receiving arrays PI1, PI2, the detection signals resulting from the plurality of light-receiving elements corresponding in phase are added together to represent a position within one pitch. In terms of the properties of such signals, the light-receiving arrays PI1, PI2 have a relatively high resistance to noise since the noise is averaged, whereas the light-receiving array PA has a relatively low resistance to noise. Then, in a case where an LED or the like is used as the light source 121, galvanic noise light that does not change temporally occurs near the light source 121.

According to this embodiment, the light source 121 and the respective light-receiving arrays are disposed in the order of the light-receiving array PI2, the light source 121, the light-receiving array PI1, and the light-receiving array PA, from the outside toward the inside in the width direction R. With this arrangement, it is possible to dispose the light-receiving arrays PI1, PI2 having high resistance to noise in a position near the light source 121 while disposing the light-receiving array PA having low resistance to noise in a position away from the light source 121. Consequently, it is possible to suppress the effect of the noise resulting from the aforementioned galvanic noise light to a minimum.

Further, according to this embodiment, advantages such as the following are achieved. That is, in a case where an LED or the like is used as the light source 121, the light source 121 may comprise light distribution characteristics with high directivity. In such a case, the amount of reflection light (light intensity) changes relatively greatly in the area near the circumference of the light source 121, but the change in the amount of reflection light is relatively small in the area on the outside thereof. Then, in the light-receiving array PA that outputs an absolute signal, a bit pattern resulting from detection or non-detection by each of the plurality of light-receiving elements uniquely represents an absolute position. In terms of the properties of such a signal, if the amount of received light of the respective light-receiving elements varies, erroneous detection of the absolute position readily occurs, and thus the amount of received light of the respective light-receiving elements is preferably uniform, and the light-receiving array PA is preferably disposed in an area where there is small change in the amount of light.

According to this embodiment, the light-receiving array PI1 is disposed between the light source 121 and the light-receiving array PA. With this arrangement, it is possible to separate the light-receiving array PA from the light source 121 and dispose it in the aforementioned area where there is small change in the amount of light. As a result, it is possible to increase the reliability of the absolute signal output from the light-receiving array PA.

Further, according to this embodiment, only the light-receiving array PI2 is disposed further on the outer circumference side than the light source 121. With this arrangement, the width direction dimension is not regulated in the adjacent light-receiving array PA as in the light-receiving array PI1, making it possible to lengthen the width direction dimension of the light-receiving array PI2 to a greater degree than the other light-receiving array PI1. As a result, the amount of received light of the light-receiving array PI2 that determines resolution can be increased, making it possible to improve detection accuracy.

4. Modifications

The above has described in detail an embodiment while referring to accompanying drawings. Nevertheless, the spirit and the scope of the present disclosure set forth in the claims are not limited to the embodiment described above. The fact that various changes, modifications, and combinations can be extrapolated within the true spirit and scope will be apparent to persons with ordinary skill in the art affiliated with the embodiments. Consequently, any techniques resulting from these changes, modifications, and combinations are also naturally affiliated with the spirit and scope of the disclosure.

4-1. Disposing the Light-Receiving Array PA Further on the Outer Circumference than the Light-Receiving Array PI1

Figure 11:
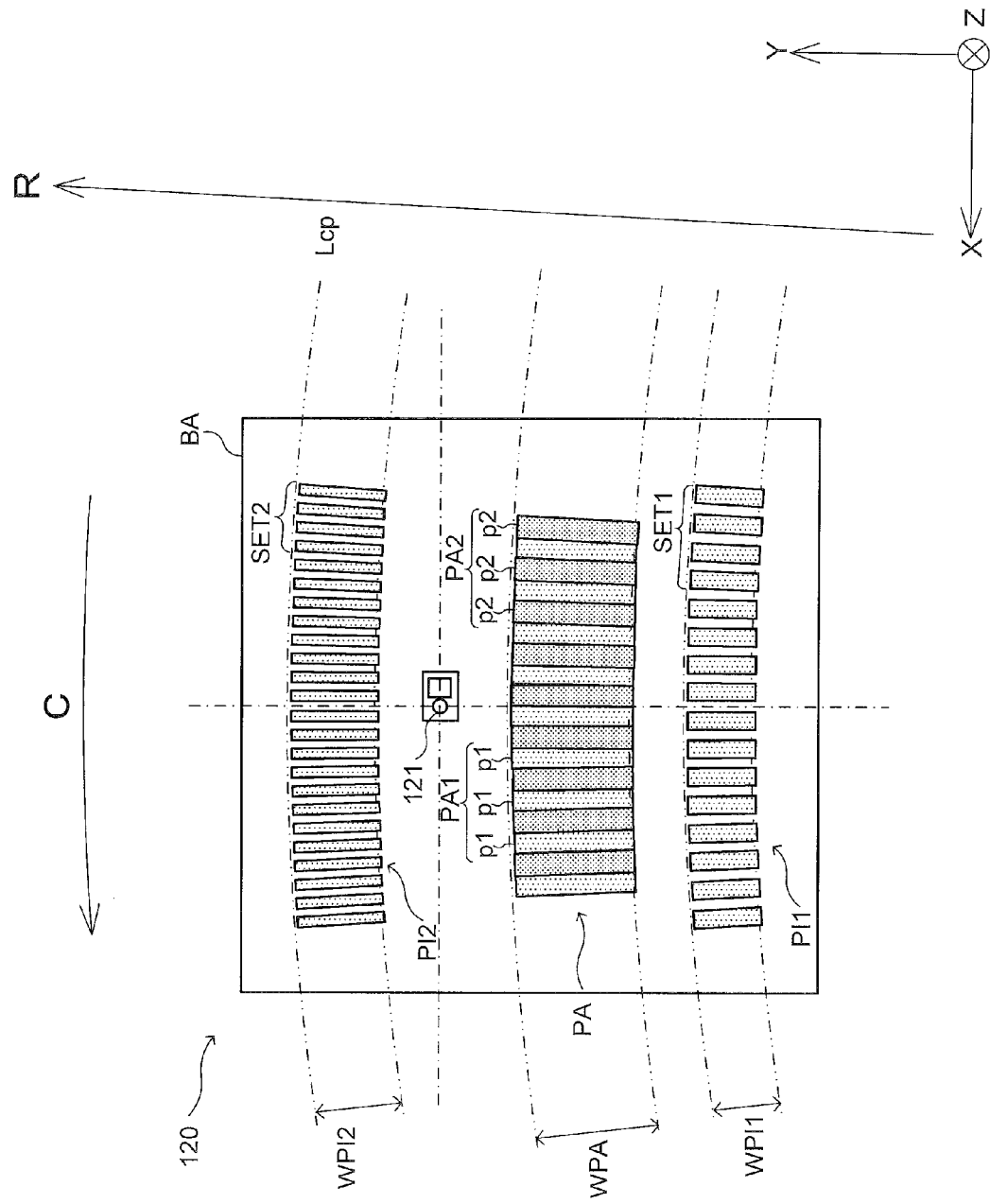
FIG. 11 is an explanatory view for explaining an optical module and a light-receiving array related to modification 1.

While the above described embodiment has described an illustrative scenario in which the light-receiving array PA is disposed on the inner circumference side with respect to the light-receiving array PI1 (the center axis side), the light-receiving array PA may be disposed on the outer circumference side with respect to the light-receiving array PI1 (the side opposite the center axis), as shown in FIG. 11, for example. That is, in this case, the light source 121 and the respective light-receiving arrays are disposed in the order of the light-receiving array PI2, the light source 121, the light-receiving array PA, and the light-receiving array PI1, from the outside toward the inside in the width direction R. Although not shown, in this case, the three slit tracks are disposed in the order of SI1, SA, SI2, from the inside toward the outside in the width direction R on the disk 110.

In a case where this configuration is adopted, the reliability of the absolute signal can be further increased. That is, in the light-receiving array PA that receives the light reflected by the slit track SA comprising an absolute pattern, the bit pattern resulting from detection or non-detection by each of the plurality of light-receiving elements uniquely represents an absolute position. On the other hand, in the light-receiving array PI1 and the light-receiving array PI2 that receive the light reflected by the slit tracks SI1, SI2 comprising an incremental pattern, the detection signals resulting from the plurality of light-receiving elements corresponding in phase are added together to represent a position within one pitch. In terms of the properties of such signals, the light-receiving arrays PI1, PI2 require a relatively small amount of received light, whereas the light-receiving array PA requires an adequate amount of received light.

According to this modification, the light-receiving array PA is disposed adjacent to the light source 121. With this arrangement, the light-receiving array PA can be disposed near the light source 121, making it possible to maintain the amount of received light and increase the reliability of the absolute signal.

Figure 12:
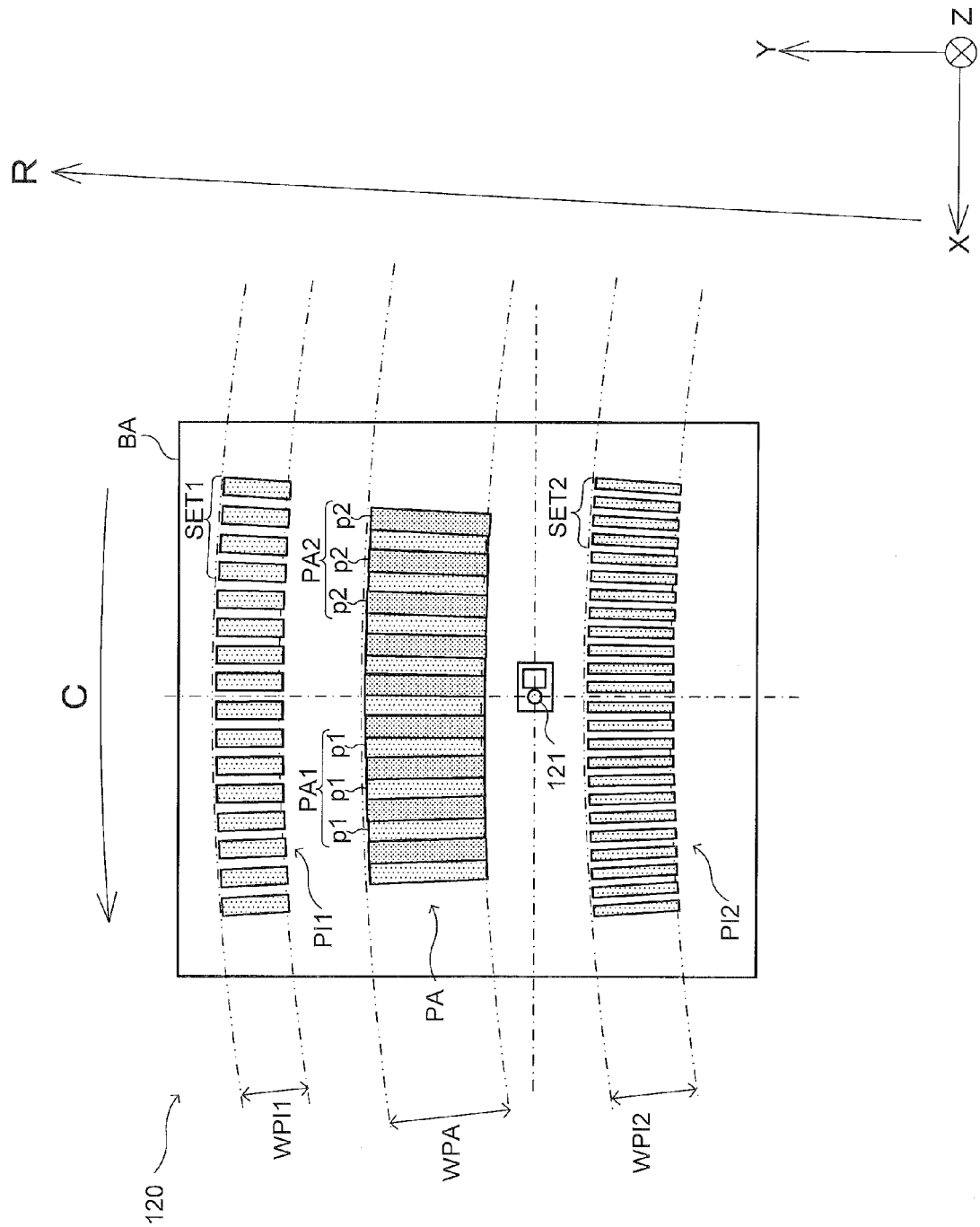
FIG. 12 is an explanatory view for explaining an optical module and a light-receiving array related to modification 2.

4-2. Disposing the Light-Receiving Array PI2 Further on the Inner Circumference Side While the above described embodiment has described an illustrative scenario in which the light-receiving array PI2 is disposed on the outer circumference side with respect to the light-receiving array PI1 and the light-receiving array PA, the light-receiving array PI2 may be disposed on the inner circumference side with respect to the light-receiving array PI1 and the light-receiving array PA, as shown in FIG. 12, for example. That is, in this case, the light source 121 and the respective light-receiving arrays are disposed in the order of the light-receiving array PI1, the light-receiving array PA, the light source 121, and the light-receiving array PI2, from the outside toward the inside in the width direction R. Although not shown, in this case, the three slit tracks are disposed in the order of SI2, SA, SI1, from the inside toward the outside in the width direction R on the disk 110. The configuration in the above described embodiment is preferably adopted in a case where the robustness with respect to the eccentricity of the high incremental signal is to be enhanced, and this configuration is preferably adopted in a case where the robustness with respect to the eccentricity of the low incremental signal is to be enhanced.

4-3. Disposing the Light-Receiving Array PA Further on the Outer Circumference Side than the Light-Receiving Array PI1

Figure 13:
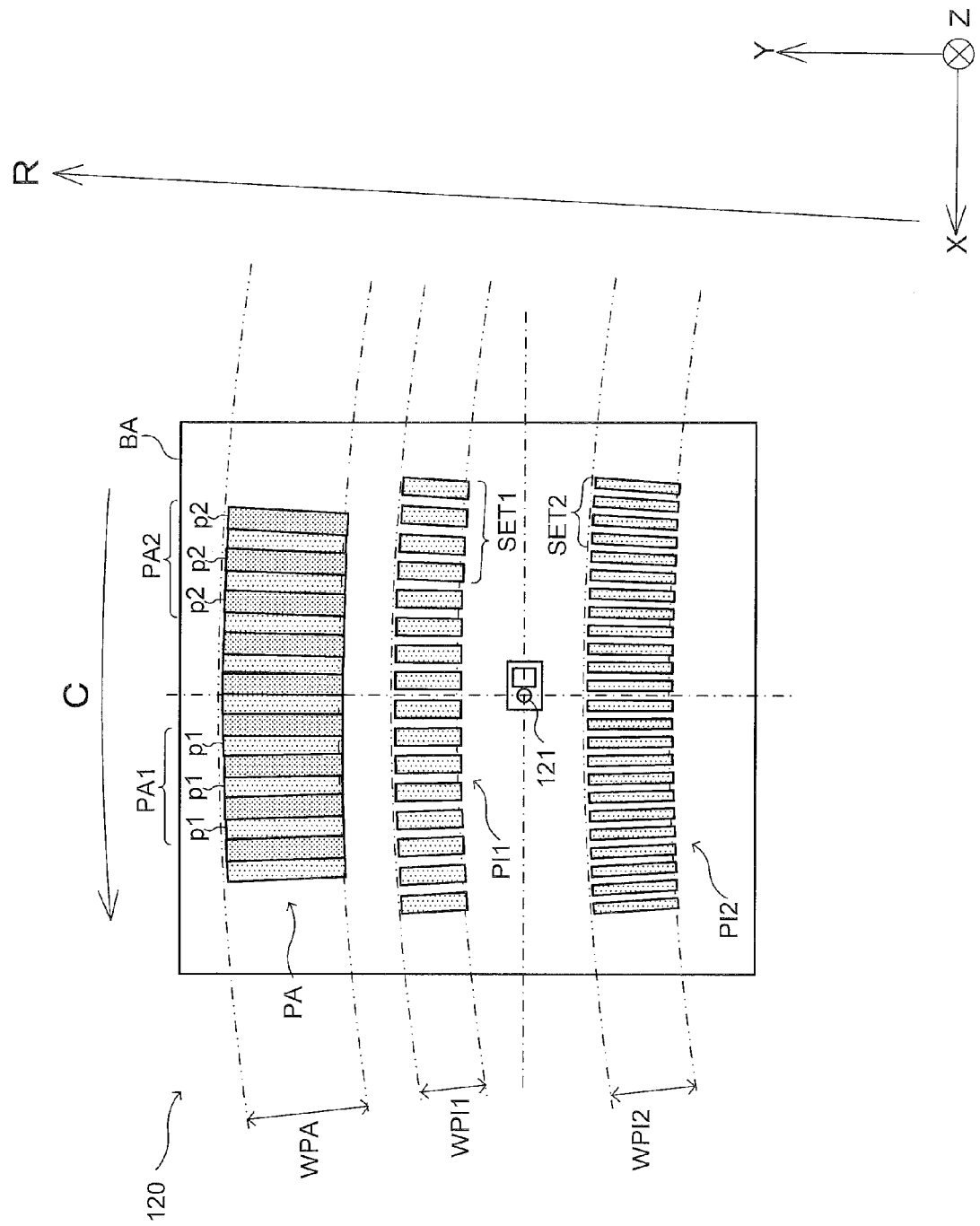
FIG. 13 is an explanatory view for explaining an optical module and a light-receiving array related to modification 3.

While the above described modification (4-2) has described an illustrative scenario in which the light-receiving array PA is disposed on the inner circumference side with respect to the light-receiving array PI1, the light-receiving array PA may be disposed on the outer circumference side with respect to the light-receiving array PI1, as shown in FIG. 13, for example. That is, in this case, the light source 121 and the respective light-receiving arrays are disposed in the order of the light-receiving array PA, the light-receiving array PI1, the light source 121, and the light-receiving array PI2, from the outside toward the inside in the width direction R. Although not shown, in this case, the three slit tracks are disposed in the order of SI2, SI1, SA, from the inside toward the outside in the width direction R on the disk 110. The configuration of the above described modification (4-2) is preferably adopted in a case where the amount of received light of the light-receiving array PA is to be increased, and this configuration is preferably adopted in a case where the light-receiving array PI1 is to be arranged near the light source 121 to increase the amount of received light.

Figure 14:
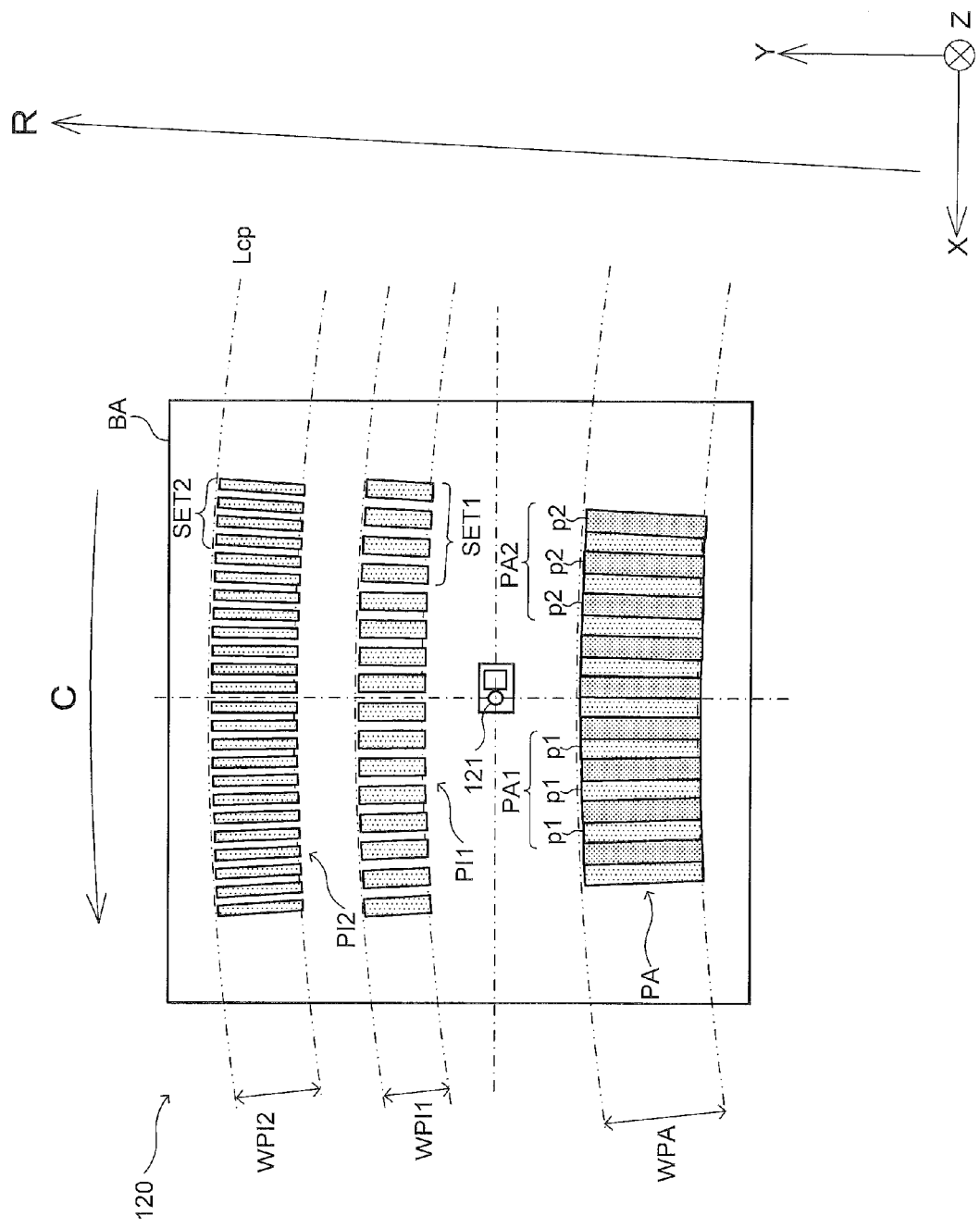
FIG. 14 is an explanatory view for explaining an optical module and a light-receiving array related to modification 4.

4-4. Disposing the Light Source Between the Light-Receiving Array PI1 and the Light-Receiving Array PA While the above described embodiment has described an illustrative scenario in which the light source 121 is disposed between the light-receiving array PI1 and the light-receiving array PI2, the light source 121 may be disposed between the light-receiving array PI1 and the light-receiving array PA, as shown in FIG. 14, for example. The light-receiving array PI2 is disposed further on the outer circumference side than the light-receiving array PI1, the light-receiving array PA, and the light source 121. According to this modification, the light source 121 and the respective light-receiving arrays are disposed in the order of the light-receiving array PI2, the light-receiving array PI1, the light source 121, and the light-receiving array PA, from the outside toward the inside in the width direction R. Although not shown, in this case, the three slit tracks are disposed in the order of SA, SI1, SI2, from the inside toward the outside in the width direction R on the disk 110.

In a case where this configuration is adopted, the light-receiving array PA can be disposed near the light source 121, making it possible to maintain the amount of received light and increase the reliability of the absolute signal.

Further, in a case where this configuration is adopted, the light-receiving array PI2 is disposed on the outermost circumference side, making it possible to decrease the detection error resulting from the eccentricity of the light-receiving array PI2 and enhance the robustness with respect to eccentricity. Further, there is also the advantage that the pitch of the slit track SI2 corresponding to the light-receiving array PI2 can be maintained as large as possible.

Further, in a case where this configuration is adopted, only the light-receiving array PA is disposed further on the inner circumference side than the light source 121, thereby making it possible to further lengthen the dimension of the light-receiving array PA in the radial direction than the other light-receiving arrays PI1, PI2. As a result, the light-receiving surface area of the light-receiving array PA that specifies the absolute position can be enlarged to increase the amount of received light, making it possible to improve the accuracy of the absolute position.

4-5. Disposing the Light-Receiving Array PA Further on the Outer Circumference Side than the Light-Receiving Array PI1

Figure 15:
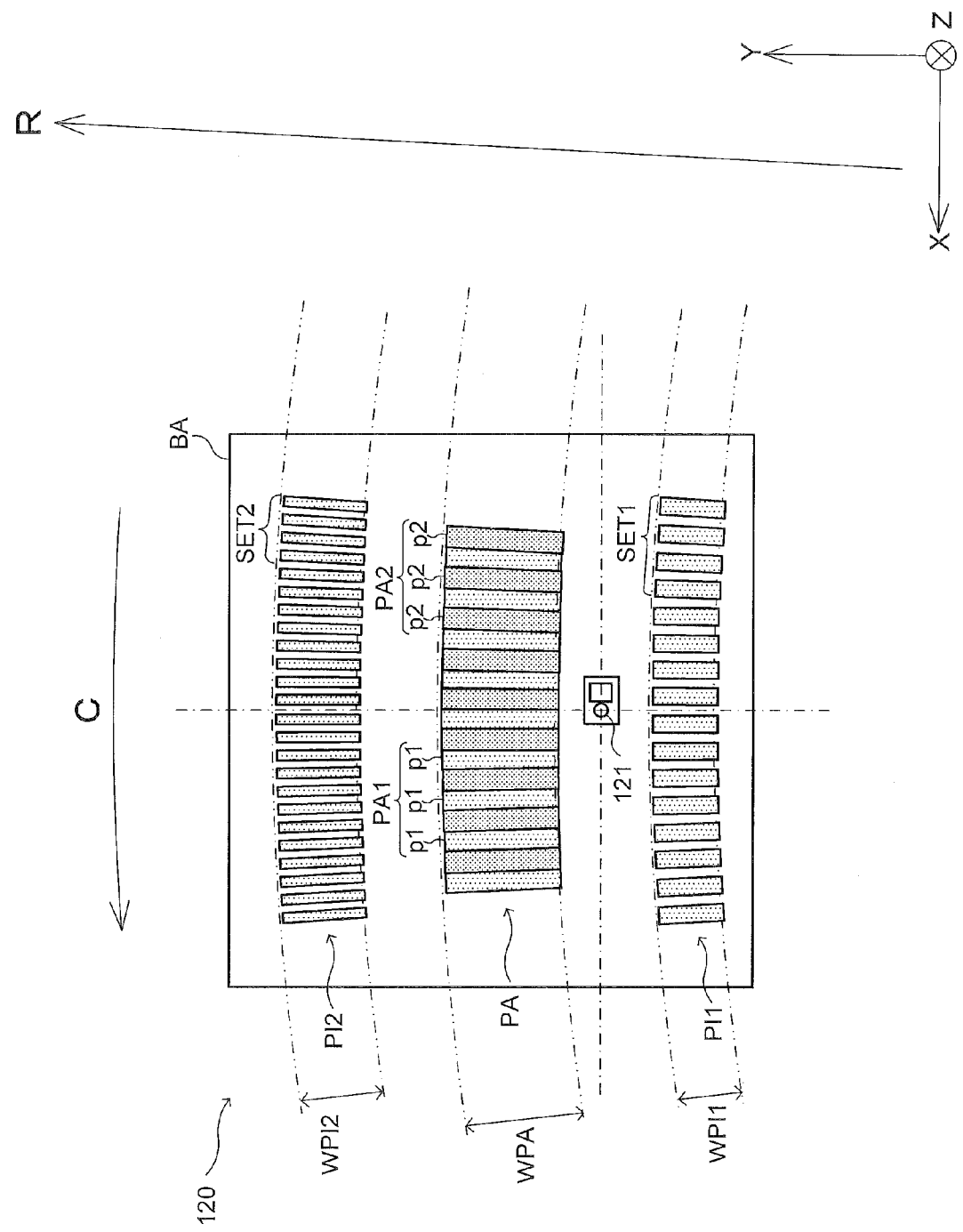
FIG. 15 is an explanatory view for explaining an optical module and a light-receiving array related to modification 5.

While the above described modification (4-4) has described an illustrative scenario in which the light-receiving array PA is disposed further on the inner circumference side than the light-receiving array PI1, the light-receiving array PA may be disposed further on the outer circumference side than the light-receiving array PI1, as shown in FIG. 15, for example. That is, in this case, the light source 121 and the respective light-receiving arrays are disposed in the order of the light-receiving array PI2, the light-receiving array PA, the light source 121, and the light-receiving array PI1, from the outside toward the inside in the width direction R. Although not shown, in this case, the three slit tracks are disposed in the order of SI1, SA, SI2, from the inside toward the outside in the width direction R on the disk 110.

In a case where this configuration is adopted, the light-receiving array PI1 and the light-receiving array PI2 can each be disposed on opposite sides, sandwiching the light source 121, making it possible to decrease the irregular reflection components from the light-receiving array PI1 to the light-receiving array PI2 based on the aforementioned intensity distribution of the irregular reflection components of the light, and suppress the travel of noise to the light-receiving array PI2. Consequently, it is possible to improve the detection accuracy and increase the reliability of the encoder 100.

Figure 16:
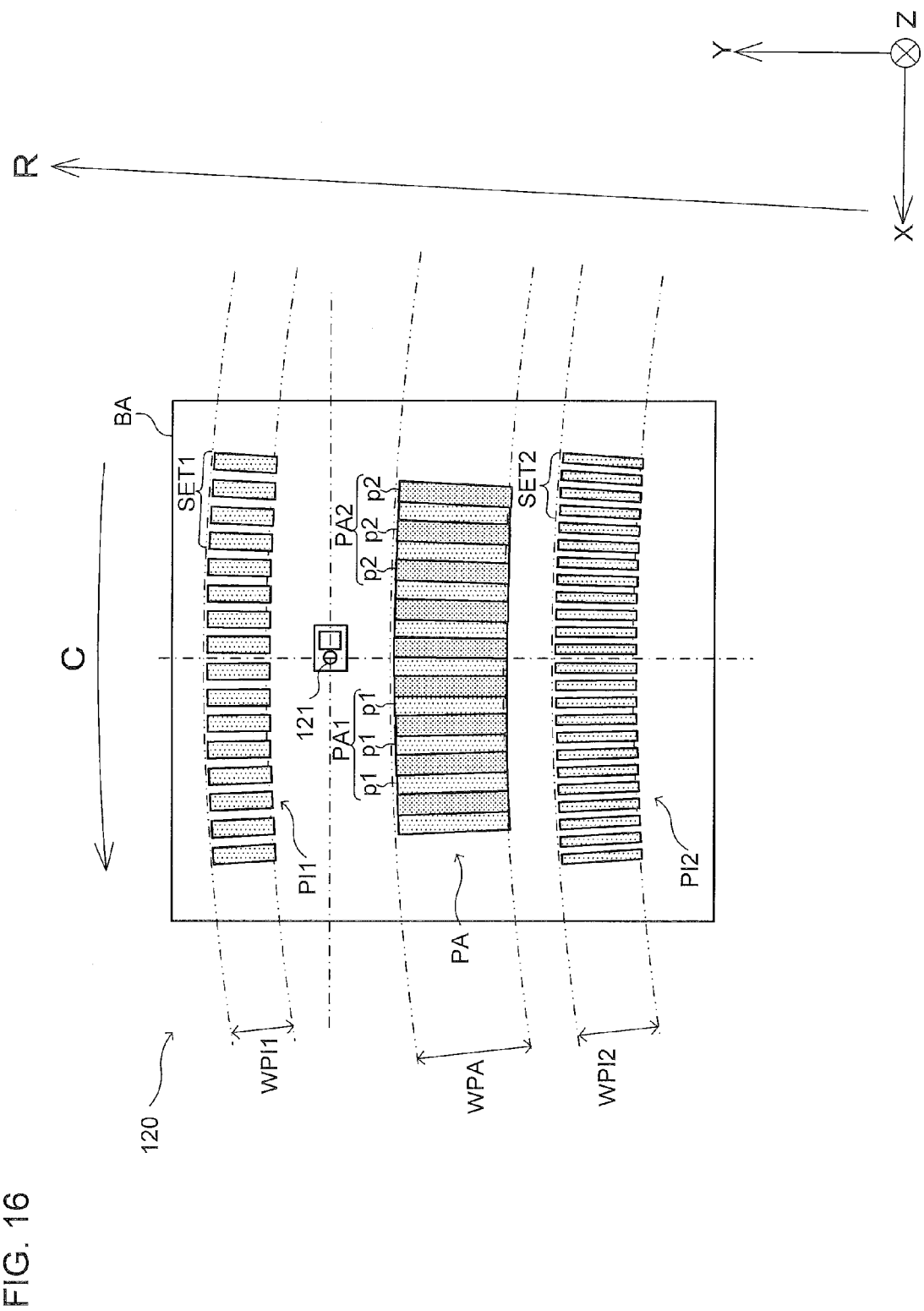
FIG. 16 is an explanatory view for explaining an optical module and a light-receiving array related to modification 6.

4-6. Disposing the Light-Receiving Array PI2 Further on the Inner Circumference Side than the Light-Receiving Arrays PI1, PA While the above described modifications (4-4) (4-5) have described illustrative scenarios in which the light-receiving array PI2 is disposed further on the outer circumference side than the light-receiving array PI1 and the light-receiving array PA, the light-receiving array PI2 may be disposed further on the inner circumference side than the light-receiving array PI1 and the light-receiving array PA, as shown in FIG. 16, for example. That is, in this case, the light source 121 and the respective light-receiving arrays are disposed in the order of the light-receiving array PI1, the light source 121, the light-receiving array PA, and the light-receiving array PI2, from the outside toward the inside in the width direction R. Although not shown, in this case, the three slit tracks are disposed in the order of SI2, SA, SI1, from the inside toward the outside in the width direction R on the disk 110.

In a case where this configuration is adopted, only the light-receiving array PI1 is disposed further on the outer circumference side than the light source 121, thereby making it possible to further lengthen the dimension of the light-receiving array PI1 in the radial direction than the other light-receiving arrays PA, PI2. As a result, the light-receiving surface area of the light-receiving array PI1 can be enlarged to increase the amount of received light, making it possible to improve the position detection accuracy.

4-7. Disposing the Light-Receiving Array PA Further on the Outer Circumference Side than the Light-Receiving Array PI1

Figure 17:
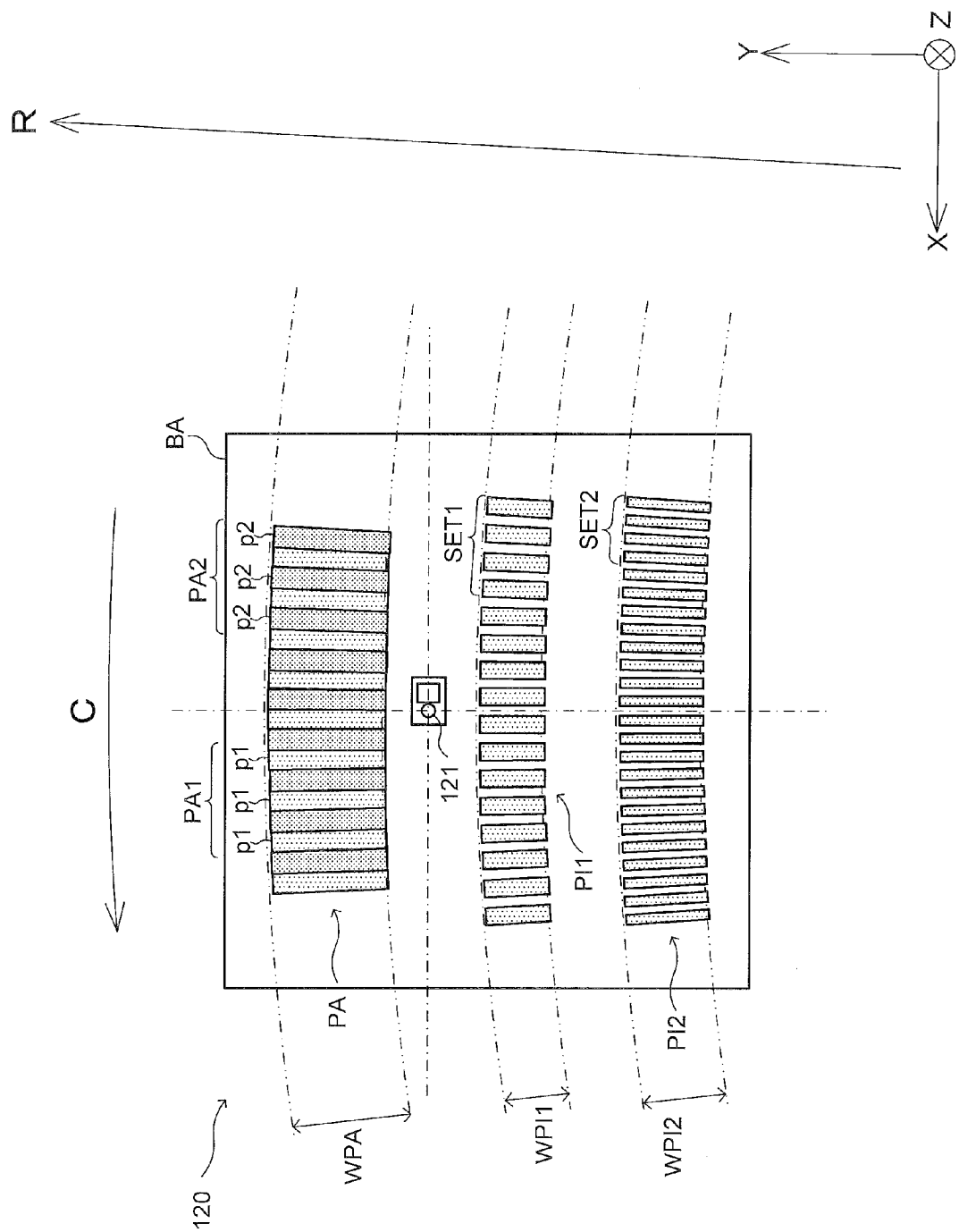
FIG. 17 is an explanatory view for explaining an optical module and a light-receiving array related to modification 7.

While the above described modification (4-6) has described an illustrative scenario in which the light-receiving array PA is disposed further on the inner circumference side than the light-receiving array PI1, the light-receiving array PA may be disposed further on the outer circumference side than the light-receiving array PI1, as shown in FIG. 17, for example. That is, in this case, the light source 121 and the respective light-receiving arrays are disposed in the order of the light-receiving array PA, the light source 121, the light-receiving array PI1, and the light-receiving array PI2, from the outside toward the inside in the width direction R. Although not shown, in this case, the three slit tracks are disposed in the order of SI2, SI1, SA, from the inside toward the outside in the width direction R on the disk 110.

In a case where this configuration is adopted, only the light-receiving array PA is disposed further on the outer circumference side than the light source 121, thereby making it possible to further lengthen the dimension of the light-receiving array PA in the radial direction than the other light-receiving arrays PI1, PI2. As a result, the light-receiving surface area of the light-receiving array PA that specifies the absolute position can be enlarged to increase the amount of received light, making it possible to improve the accuracy of the absolute position.

4-8. Disposing the Light-Receiving Array PA of Two Tracks

While the above described embodiment and the above modification have described illustrative scenarios in which the light-receiving elements p1, p2 respectively included in the light-receiving arrays PA1, PA2 are alternately disposed along the measurement direction C, thereby configuring the two light-receiving arrays PA1, PA2 as the light-receiving array PA of a single track, the light-receiving array PA may be configured as the light-receiving arrays PA1, PA2 of two tracks disposed practically symmetrically, sandwiching the light source 121.

Figure 18:
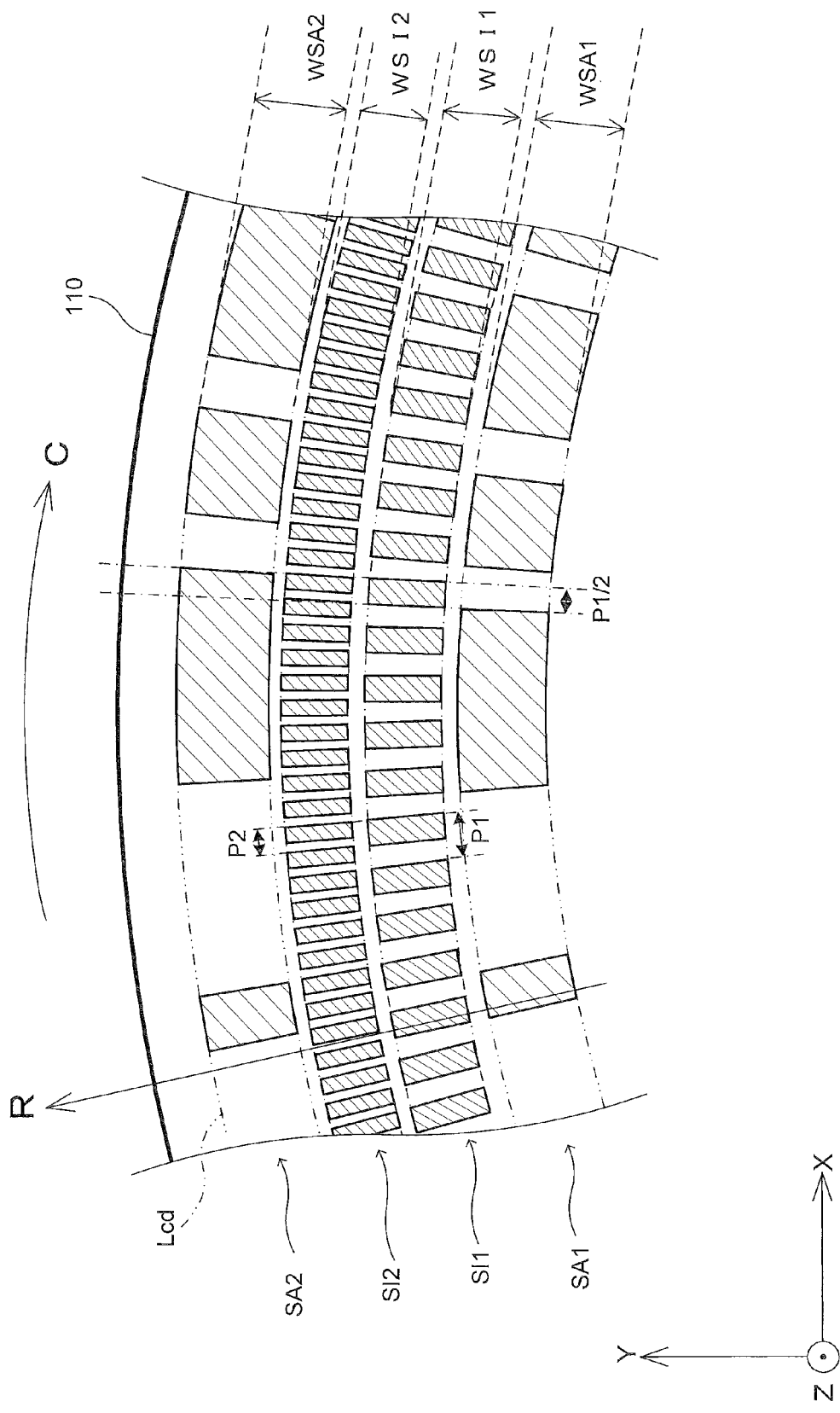
FIG. 18 is an explanatory view for explaining a slit track related to modification 8.

As shown in FIG. 18, according to this modification, four slit tracks are arranged on the upper surface of the disk 110 in the width direction. The four slit tracks are concentrically disposed in the order of SA1, SI1, SI2, SA2, from the inside toward the outside in the width direction R. A plurality of reflection slits sa1, sa2, respectively included in the slit tracks SA1, SA2, is disposed along the entire circumference of the disk 110 so as to comprise an absolute pattern in the measurement direction C.

Note that, according to this modification, the same absolute patterns are offset from each other by, for example, a length equivalent to one-half of one bit in the measurement direction C, forming the two slit tracks SA1, SA2. This offset amount is a value corresponding to, for example, half a pitch P1 of a reflection slit si1 of the slit track SI1. With this arrangement, similar to the aforementioned embodiment, the absolute position is calculated using the detection signal from the slit track SA2 or the opposite operation is performed when, for example, the absolute position by the slit track SA1 corresponds to a change point in the bit pattern. As a result, it is possible to improve the detection accuracy of the absolute position. Note that, while the amount of received light in the two light-receiving arrays PA1, PA2 needs to be uniform in the case of such a configuration, according to this modification, the two light-receiving arrays PA1, PA2 are disposed substantially equidistant from the light source as described later, making it possible to achieve the above described configuration.

Note that, instead of offsetting the respective absolute patterns of the slit tracks SA1, SA2 against each other, the light-receiving arrays PA1, PA2 respectively corresponding to the slit tracks SA1, SA2 may be offset against each other in the measurement direction C without offsetting the absolute patterns, for example.

Figure 19:
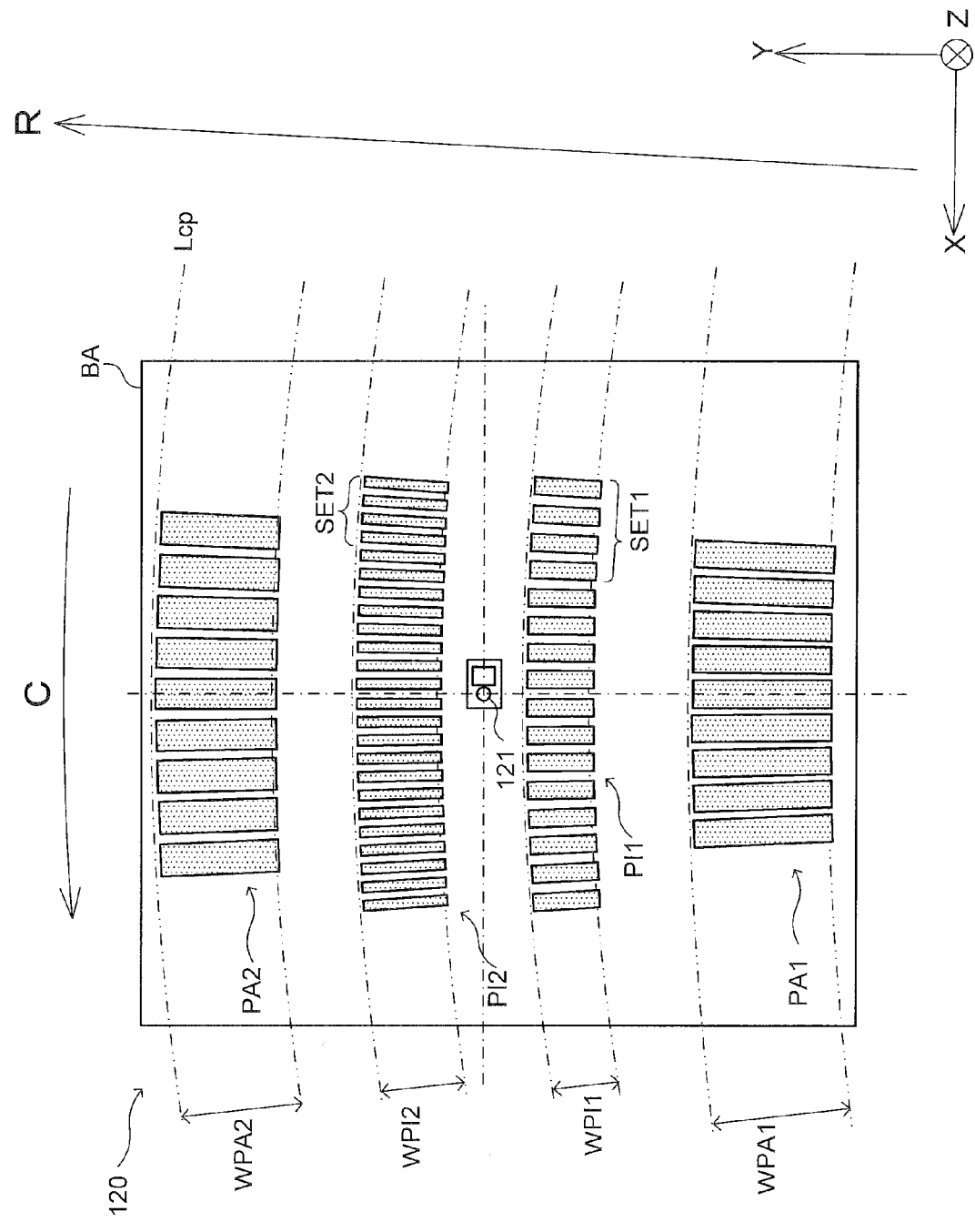
FIG. 19 is an explanatory view for explaining an optical module and a light-receiving array related to modification 8.

As shown in FIG. 19, the light-receiving array of the optical module 120 in this modification is disposed correspondingly to each of the four slit tracks SA1, SA2, SI1, SI2. The light-receiving array PA1 is configured to receive the light reflected by the slit track SA1, and the light-receiving array PA2 is configured to receive the light reflected by the slit track SA2. The light-receiving arrays PI1, PI2 are the same as those in the aforementioned embodiment.

The light-receiving arrays PA1, PA2 corresponding to the absolute pattern are disposed sandwiching the light source 121 in the width direction R. In this example, the light-receiving array PA1 is disposed on the inner circumference side, and the light-receiving array PA2 is disposed on the outer circumference side. According to this embodiment, the distances between each of the light-receiving arrays PA1, PA2 and the light source 121 are practically equal. That is, the light-receiving arrays PA1, PA2 are basically formed into an axisymmetrical shape with the line on the width direction R and the line on the measurement direction C that pass through the light source 121 as the axes of symmetry (excluding the curved shape with the measurement center Os as the center). Then, the plurality of light-receiving elements included in the light-receiving arrays PA1, PA2 is arranged side by side at a certain pitch along the measurement direction C (the line Lcp). The light-receiving arrays PA1, PA2 respectively receive the reflection light from the slit tracks SA1, SA2, thereby generating an absolute signal comprising a bit pattern in the number of light-receiving elements. Note that the light-receiving arrays PA1, PA2 each correspond to one example of the third light-receiving array, and also to one example of means for receiving light reflected by the slit track comprising an absolute pattern.

Then, the light-receiving arrays PI1, PI2 are disposed between the light-receiving arrays PA1, PA2, and the light source 121 is disposed between the light-receiving array PH and the light-receiving array PI2. As a result, the light source 121 and the respective light-receiving arrays are disposed in the order of the light-receiving array PA2, the light-receiving array PI2, the light source 121, the light-receiving array PI1, and the light-receiving array PA1, from the outside toward the inside in the width direction R.

In a case where this configuration is adopted, it is possible to increase the intensity of the absolute signal, in addition to the same advantages as the above described embodiment, thereby making it possible to improve the position detection accuracy and increase resistance to vibration, etc.

4-9. Disposing the Light-Receiving Array PI1 Further on the Outer Circumference Side than the Light-Receiving Array PI2

Figure 20:
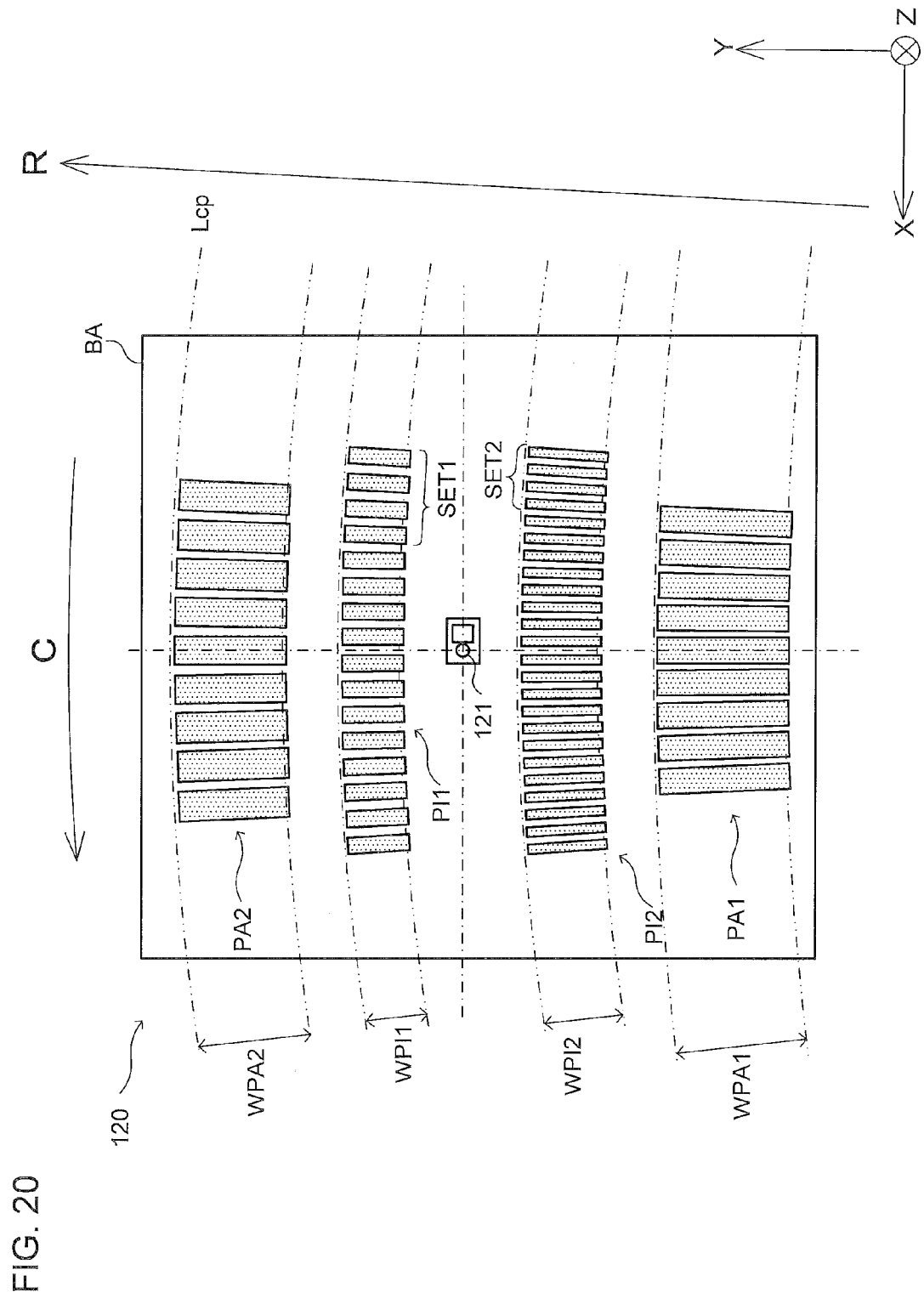
FIG. 20 is an explanatory view for explaining an optical module and a light-receiving array related to modification 9.

While the above described modification (4-8) has described an illustrative scenario in which the light-receiving array PH is disposed further on the inner circumference side than the light-receiving array PI2, the light-receiving array PI1 may be disposed further on the outer circumference side than the light-receiving array PI2, as shown in FIG. 20, for example. That is, in this case, the light source 121 and the respective light-receiving arrays are disposed in the order of the light-receiving array PA2, the light-receiving array PI1, the light source 121, the light-receiving array PI2, and the light-receiving array PA1, from the outside toward the inside in the width direction R. Although not shown, in this case, the four slit tracks are disposed in the order of SA1, SI2, SI1, SA2, from the inside toward the outside in the width direction R on the disk 110. The configuration in the above described modification (4-8) is preferably adopted in a case where the robustness with respect to the eccentricity of the high incremental signal is to be enhanced, and this configuration is preferably adopted in a case where the robustness with respect to the eccentricity of the low incremental signal is to be enhanced.

4-10. Disposing the Light-Receiving Arrays PA1, PA2 Further on the Inside than the Light-Receiving Arrays PI1, PI2

Figure 21:
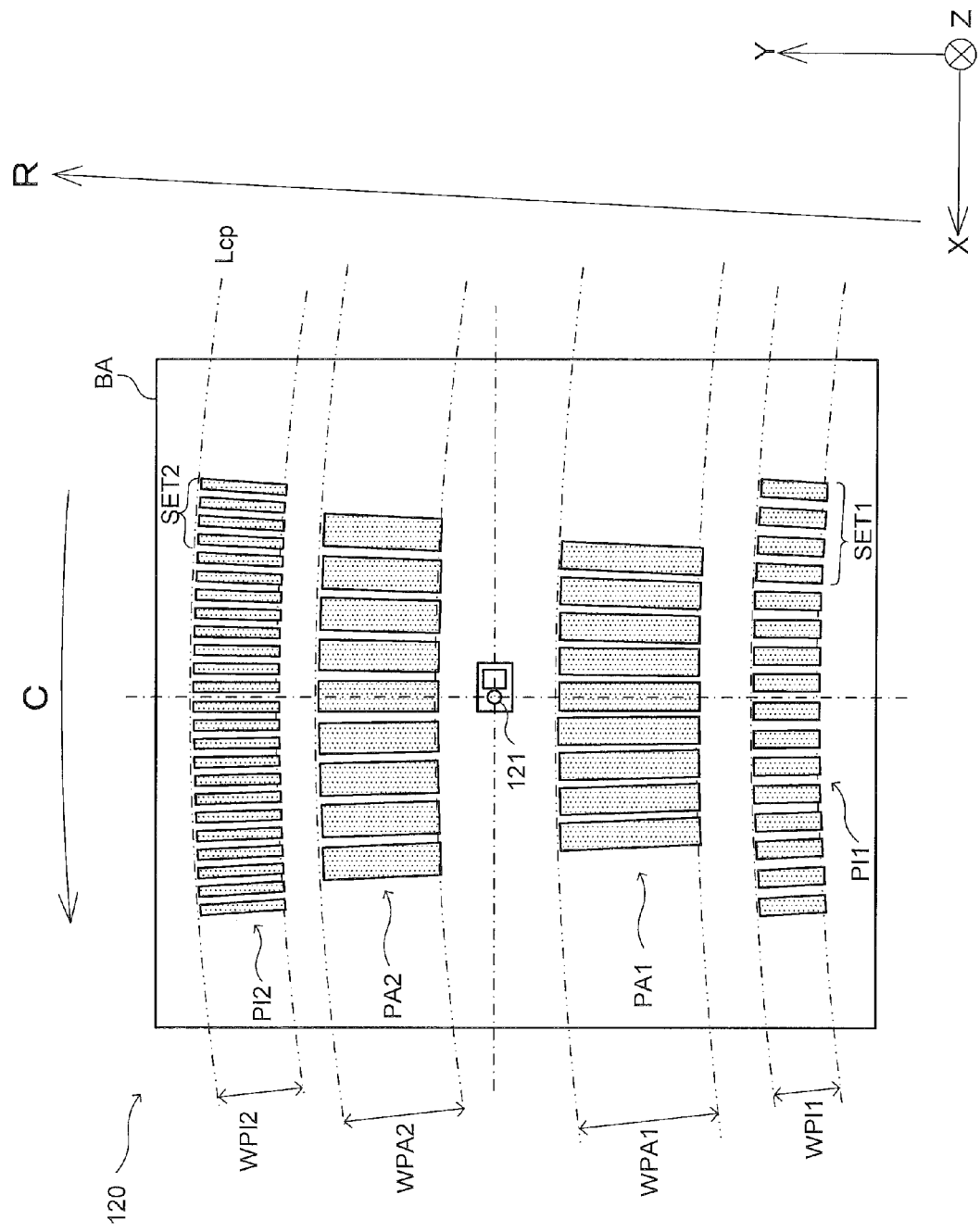
FIG. 21 is an explanatory view for explaining an optical module and a light-receiving array related to modification 10.

While the above described modifications (4-8) (4-9) have described illustrative scenarios in which the light-receiving arrays PA1, PA2 are disposed on the outside of the light-receiving arrays PI1, PI2, the light-receiving arrays PA1, PA2 may be disposed on the inside of the light-receiving arrays PI1, PI2, as shown in FIG. 21, for example. According to this modification, the light-receiving array PI2 is disposed on the outer circumference side of the light-receiving arrays PA1, PA2, and the light-receiving array PI1 is disposed on the inner circumference side of the light-receiving arrays PA1, PA2. That is, in this case, the light source 121 and the respective light-receiving arrays are disposed in the order of the light-receiving array PI2, the light-receiving array PA2, the light source 121, the light-receiving array PA1, and the light-receiving array PI1, from the outside toward the inside in the width direction R. Although not shown, in this case, the four slit tracks are disposed in the order of SI1, SA1, SA2, SI2, from the inside toward the outside in the width direction R on the disk 110. The configuration in this modification can be adopted in a case where there is a desire to arrange the light-receiving arrays PA1, PA2 near the light source 121 to increase the amount of received light.

4-11. Disposing the Light-Receiving Array PH Further on the Outer Circumference Side than the Light-Receiving Array PI2

Figure 22:
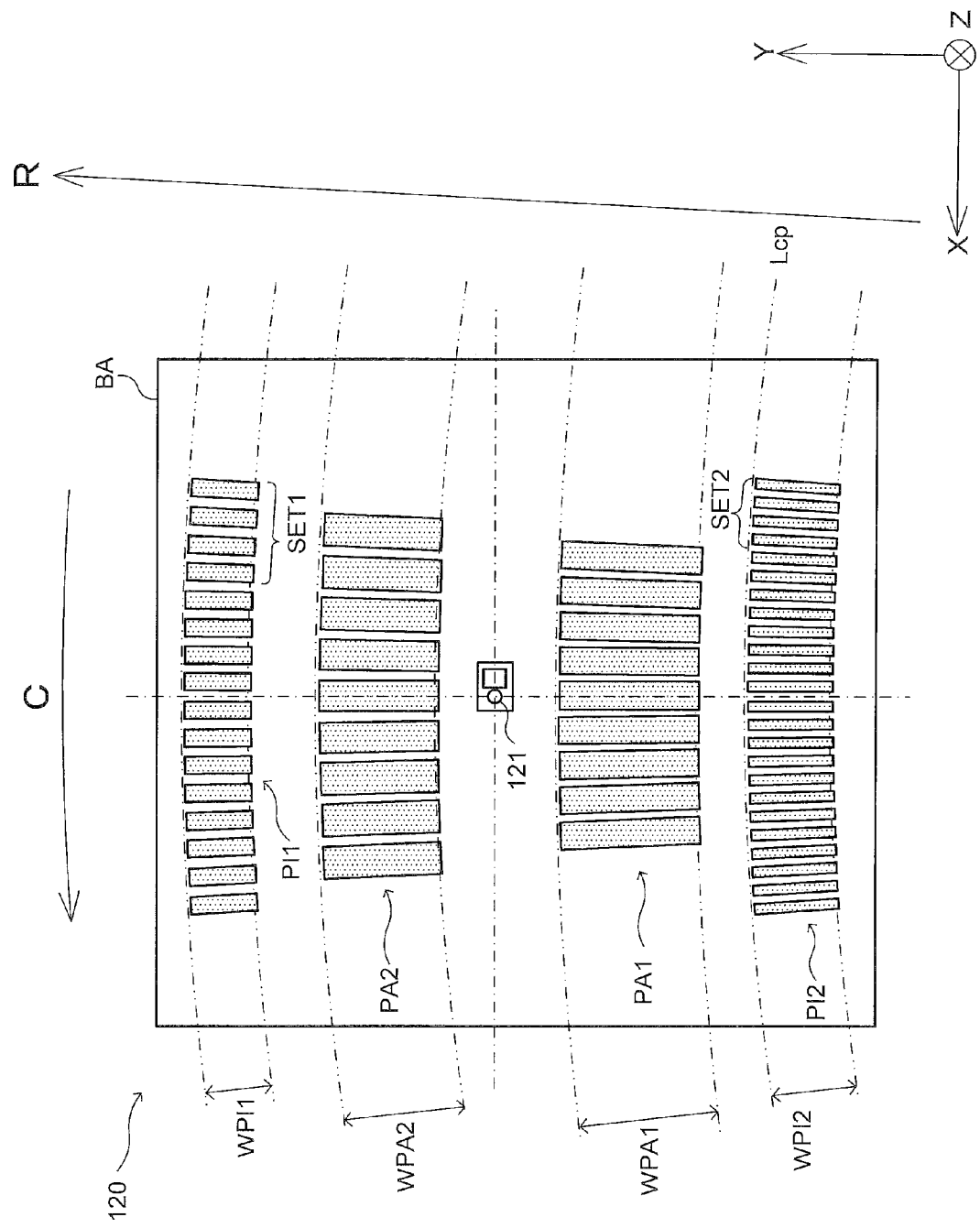
FIG. 22 is an explanatory view for explaining an optical module and a light-receiving array related to modification 11.

While the above described modification (4-10) has described an illustrative scenario in which the light-receiving array PI1 is disposed further on the inner circumference side than the light-receiving array PI2, the light-receiving array PI1 may be disposed further on the outer circumference side than the light-receiving array PI2, as shown in FIG. 22, for example. That is, in this case, the light source 121 and the respective light-receiving arrays are disposed in the order of the light-receiving array PI1, the light-receiving array PA2, the light source 121, the light-receiving array PA1, and the light-receiving array PI2, from the outside toward the inside in the width direction R. Although not shown, in this case, the four slit tracks are disposed in the order of SI2, SA1, SA2, SI1, from the inside toward the outside in the width direction R on the disk 110. The configuration in the above described modification (4-10) is preferably adopted in a case where the robustness with respect to the eccentricity of the high incremental signal is to be enhanced, and this configuration is preferably adopted in a case where the robustness with respect to the eccentricity of the low incremental signal is to be enhanced.

4-12. Disposing the Light-Receiving Arrays PI1, PI2 on One Outside of the Light-Receiving Arrays PA1, PA2

Figure 23:
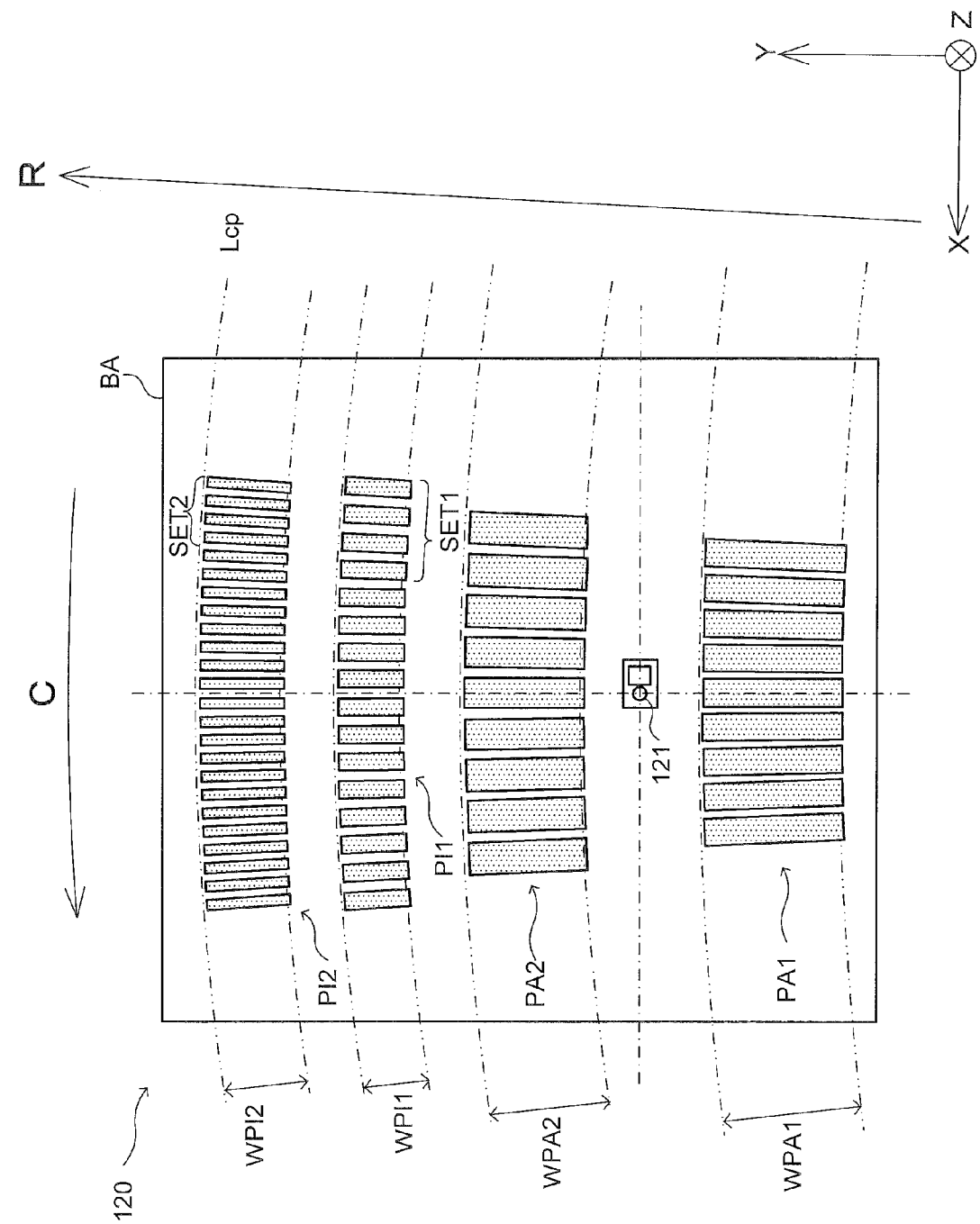
FIG. 23 is an explanatory view for explaining an optical module and a light-receiving array related to modification 12.

While the above described modifications (4-10) (4-11) have described illustrative scenarios in which the light-receiving array PI1 and the light-receiving array PI2 are disposed on both sides, sandwiching the light-receiving arrays PA1, PA2, the light-receiving arrays PI1, PI2 may be disposed on one outside of the light-receiving arrays PA1, PA2, as shown in FIG. 23, for example. According to this modification, the light-receiving arrays PI1, PI2 are disposed on the outer circumference side of the light-receiving arrays PA1, PA2. That is, in this case, the light source 121 and the respective light-receiving arrays are disposed in the order of the light-receiving array PI2, the light-receiving array PI1, the light-receiving array PA2, the light source 121, and the light-receiving array PA1, from the outside toward the inside in the width direction R. Although not shown, in this case, the four slit tracks are disposed in the order of SA1, SA2, SI1, SI2, from the inside toward the outside in the width direction R on the disk 110.

In a case where this configuration is adopted, it is possible to enhance the robustness with respect to mechanical displacement. That is, in order to stack up the multiplication processing of the signal of the light-receiving array PI1 and the multiplication processing of the signal of the light-receiving array PI2 to increase the resolution of the encoder 100, it is necessary to position both of the light-receiving arrays PI1, PI2 with high accuracy in order to make the phases of the signals of both of the light-receiving arrays PI1, PI2 agree.

According to this modification, the light-receiving arrays PI1, PI2 are disposed on the outer circumference side of the light-receiving arrays PA1, PA2. With this arrangement, it is possible to dispose the light-receiving array PI1 and the light-receiving array PI2 in close proximity, thereby making the alignment when forming both of the light-receiving arrays PI1, PI2 on the substrate BA and when positioning the optical module 120 with respect to the disk 110 extremely easy, significantly improving the fabricability of the encoder 100. Further, compared to a case where both of the light-receiving arrays PI1, PI2 are separated, the effect by mechanical displacement resulting from attachment errors (eccentricity of the disk 110, etc.) and manufacturing errors is decreased, making it possible to enhance the robustness with respect to mechanical displacement.

4-13. Disposing the Light-Receiving Arrays PI1, PI2 on the Other Outside of the Light-Receiving Arrays PA1, PA2

Figure 24:
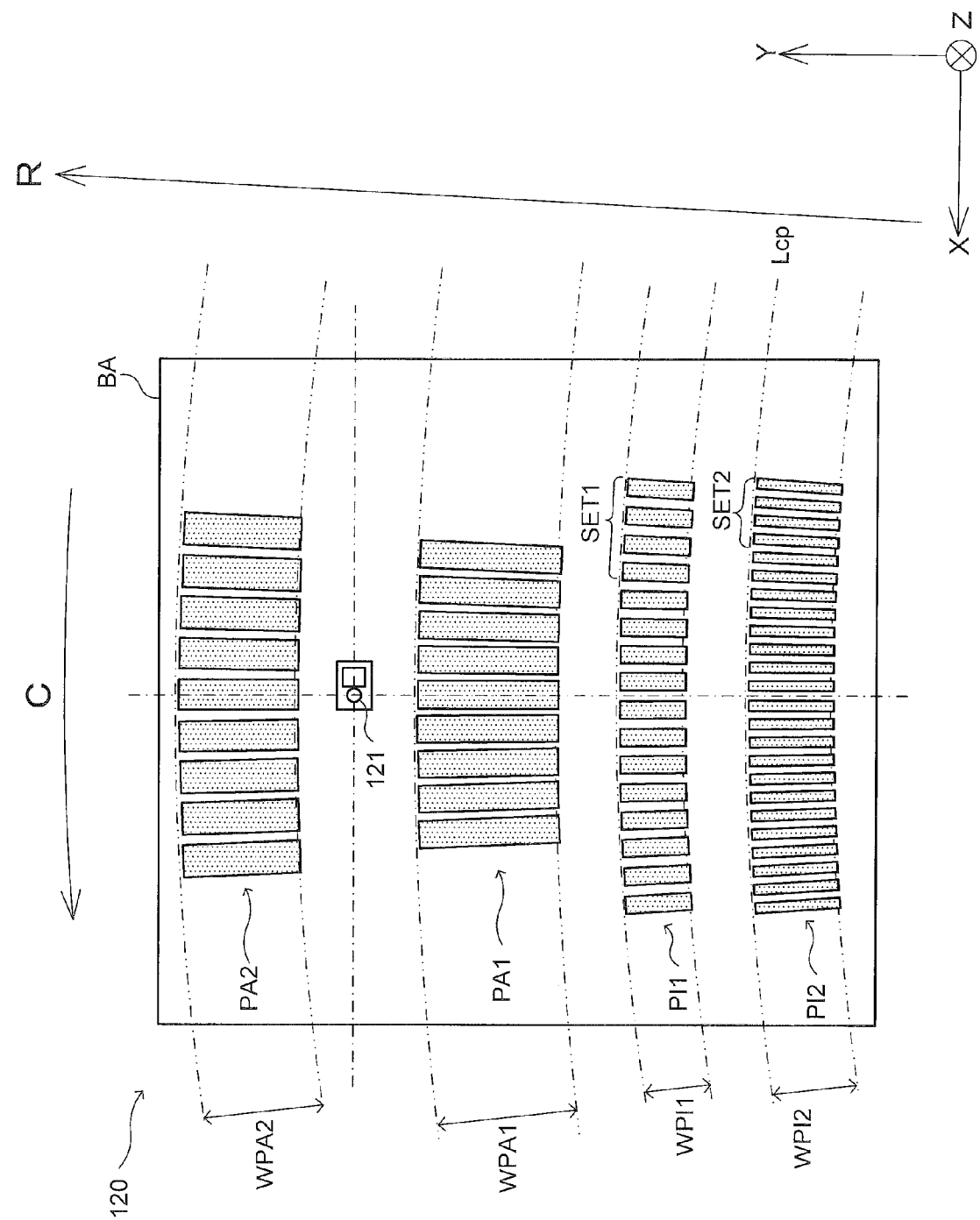
FIG. 24 is an explanatory view for explaining an optical module and a light-receiving array related to modification 13.

While the above described modification (4-12) has described an illustrative scenario in which the light-receiving arrays PI1, PI2 are disposed on the outer circumference side of the light-receiving arrays PA1, PA2, the light-receiving arrays PI1, PI2 may be disposed on the inner circumference side of the light-receiving arrays PA1, PA2, as shown in FIG. 24, for example. In this case, the light source 121 and the respective light-receiving arrays are disposed in the order of the light-receiving array PA2, the light source 121, the light-receiving array PA1, the light-receiving array PI1, and the light-receiving array PI2, from the outside toward the inside in the width direction R. Although not shown, in this case, the four slit tracks are disposed in the order of SI2, SI1, SA1, SA2, from the inside toward the outside in the width direction R on the disk 110. The configuration in the above described modification (4-12) is adopted in a case where the robustness with respect to the eccentricity of the incremental signal is to be enhanced, and the configuration in this modification is adopted in a case where the robustness with respect to the eccentricity of the absolute signal is to be enhanced.

4-14. Other

While the above has described a case where the two slit tracks SI1, SI2 comprising incremental patterns that differ in pitch are disposed on the disk 110, three or more slit tracks comprising incremental patterns that differ in pitch may be disposed. In this case as well, it is possible to achieve high resolution by the stacking-up method. At this time, it is also possible to use at least one of the light-receiving arrays PA1, PA2 for the incremental signal, for example.

Further, while the above has described a case where each of the light-receiving arrays PA1, PA2 comprises nine light-receiving elements, and the absolute signal represents the absolute position of nine bits, the number of light-receiving elements may be a number other than nine, and the number of bits of the absolute signal is also not limited to nine. Further, the number of the light-receiving elements of the light-receiving arrays PI1, PI2 is also not particularly limited to the number according to the above described embodiment.

Further, while the above has described a case where the encoder 100 is directly connected to the motor M, the encoder 100 may be connected via another mechanism, such as a reduction device, rotating direction converter, or the like, for example.

What is claimed is:

1. An encoder, comprising:
   a plurality of slit tracks that respectively comprise a plurality of reflection slits arranged along a measurement direction;
   means for emitting diffusion light to the plurality of slit tracks;
   first means for receiving light reflected by the slit track comprising an incremental pattern;
   second means for receiving light reflected by the slit track comprising an incremental pattern longer in pitch than other incremental patterns, disposed at a position on a side of a direction where the means for emitting diffusion light is disposed, than the first means; and
   third means for receiving light reflected by the slit track comprising an absolute pattern, disposed at a position on a side of a direction where the means for emitting diffusion light is disposed, than the first means.

2. An encoder, comprising:
   a plurality of slit tracks that respectively comprise a plurality of reflection slits arranged along a measurement direction;
   a point light source configured to emit diffusion light to the plurality of slit tracks;
   a first light-receiving array configured to receive light reflected by the slit track comprising an incremental pattern;
   a second light-receiving array that is configured to receive light reflected by the slit track comprising an incremental pattern longer in pitch than other incremental patterns, and is disposed at a position on a side of a direction where the point light source is disposed, than the first light-receiving array; and
   a third light-receiving array that is configured to receive light reflected by the slit track comprising an absolute pattern, and is disposed at a position on a side of a direction where the point light source is disposed, than the first light-receiving array.

3. The encoder according to claim 2, wherein:
the point light source is disposed between the arrays consisting of the second light-receiving array and the third light-receiving array, and the first light-receiving array.

4. The encoder according to claim 3, wherein:
the measurement direction is a circumferential direction with a center axis as the center; and
the second light-receiving array, the third light-receiving array, and the point light source are disposed on the center axis side than the first light-receiving array.

5. The encoder according to claim 4, wherein:
the point light source and the first to third light-receiving arrays are disposed in the order of the first light-receiving array, the point light source, the third light-receiving array, and the second light-receiving array, toward the center axis from an outer portion in a radial direction of a circle.

6. The encoder according to claim 5, wherein:
the third light-receiving array is configured as a light-receiving array of two tracks disposed so as to be practically symmetrical, sandwiching the point light source.

7. The encoder according to claim 4, wherein:
the point light source and the first to third light-receiving arrays are disposed in the order of the first light-receiving array, the point light source, the second light-receiving array, and the third light-receiving array, toward the center axis from an outer portion in a radial direction of a circle.

8. The encoder according to claim 7, wherein:
the third light-receiving array is configured as a light-receiving array of two tracks disposed so as to be practically symmetrical, sandwiching the point light source.

9. The encoder according to claim 4, wherein:
the third light-receiving array is configured as a light-receiving array of two tracks disposed so as to be practically symmetrical, sandwiching the point light source.

10. The encoder according to claim 3, wherein:
the third light-receiving array is configured as a light-receiving array of two tracks disposed so as to be practically symmetrical, sandwiching the point light source.

11. The encoder according to claim 2, wherein:
the third light-receiving array is configured as a light-receiving array of two tracks disposed so as to be practically symmetrical, sandwiching the point light source.

12. The encoder according to claim 2, wherein:
the point light source is disposed between the second light-receiving array and the third light-receiving array.

13. The encoder according to claim 12, wherein:
the measurement direction is a circumferential direction with a center axis as the center; and
the first light-receiving array is disposed on an outer portion of a circle in a radial direction than anyone of the second light-receiving array, the third light-receiving array, and the point light source.

14. The encoder according to claim 13, wherein:
the point light source and the first to third light-receiving arrays are disposed in the order of the first light-receiving array, the second light-receiving array, the point light source, and the third light-receiving array, toward the center axis from an outer portion in a radial direction of a circle.

15. The encoder according to claim 13, wherein:
the point light source and the first to third light-receiving arrays are disposed in the order of the first light-receiving array, the third light-receiving array, the point light source, and the second light-receiving array, toward the center axis from an outer portion in a radial direction of a circle.

16. A motor with an encoder, comprising:
a linear motor wherein a mover moves with respect to a stator, or a rotary motor wherein a rotor rotates with respect to a stator; and
the encoder according to claim 2 configured to detect at least one of a position and a velocity of the mover or the rotor.

17. A servo system comprising:
a linear motor wherein a mover moves with respect to a stator, or a rotary motor wherein a rotor rotates with respect to a stator;
the encoder according to claim 2 configured to detect at least one of a position and a velocity of the mover or the rotor; and
a controller configured to control the linear motor or the rotary motor based on a detection result of the encoder.

* * * * *